(12) United States Patent
Inoue et al.

(10) Patent No.: US 9,992,478 B2
(45) Date of Patent: Jun. 5, 2018

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR SYNTHESIZING IMAGES

(71) Applicant: CANON KABUSHIKI KAISHA, Tokyo (JP)

(72) Inventors: Chiaki Inoue, Utsunomiya (JP); Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/986,878

(22) Filed: Jan. 4, 2016

(65) Prior Publication Data
US 2016/0205380 A1 Jul. 14, 2016

(30) Foreign Application Priority Data

Jan. 9, 2015 (JP) ................................. 2015-002944

(51) Int. Cl.
*H04N 13/02* (2006.01)
*H04N 5/232* (2006.01)
(Continued)

(52) U.S. Cl.
CPC ........... *H04N 13/0239* (2013.01); *G06T 7/13* (2017.01); *G06T 7/73* (2017.01); *H04N 5/2258* (2013.01);
(Continued)

(58) Field of Classification Search
CPC ........... H04N 13/0239; H04N 13/0242; H04N 13/0253; H04N 13/0271; H04N 5/2258;
(Continued)

(56) References Cited

U.S. PATENT DOCUMENTS 7,676,146 B2 * 3/2010 Border ................. H04N 5/2258
348/22
9,208,396 B2 * 12/2015 Nishiyama ............... G06T 5/50
(Continued)

FOREIGN PATENT DOCUMENTS

CN 103051833 A 4/2013
CN 103813108 A 5/2014
(Continued)

OTHER PUBLICATIONS

Extended European Search Report issued in European Appl. No. 16150028.5 dated Jun. 29, 2016.
(Continued)

*Primary Examiner* — Roberto Velez
*Assistant Examiner* — Tuan Le
(74) *Attorney, Agent, or Firm* — Rossi, Kimms & McDowell LLP

(57) ABSTRACT

An image processing apparatus includes an image capturing condition acquirer (260) configured to acquire image capturing condition information of a plurality of images having angles of view different from each other, a distance information acquirer (230) configured to acquire distance information of an object included in the plurality of images, an angle of view information acquirer (240) configured to acquire angle of view information, and an image generator (224) configured to generate an image corresponding to the angle of view information from the plurality of images based on the image capturing condition information, the distance information, and the angle of view information, and the distance information is object distance information at each position in an image.

17 Claims, 16 Drawing Sheets

(51) Int. Cl.
*H04N 5/225* (2006.01)
*G06T 7/73* (2017.01)
*G06T 7/13* (2017.01)

(52) U.S. Cl.
CPC ..... *H04N 5/23212* (2013.01); *H04N 5/23232* (2013.01); *H04N 5/23296* (2013.01); *H04N 13/0242* (2013.01); *H04N 13/0253* (2013.01); *H04N 13/0271* (2013.01); *H04N 13/025* (2013.01)

(58) Field of Classification Search
CPC ........... H04N 5/23212; H04N 5/23232; H04N 5/23296; H04N 13/025; H04N 5/23229; H04N 9/09; H04N 13/0011; H04N 5/2627; G06T 7/73; G06T 7/13
See application file for complete search history.

(56) References Cited

U.S. PATENT DOCUMENTS

| | | | |
|---|---|---|---|
| 9,253,397 B2 * | 2/2016 | Lee | ............ H04N 5/2258 |
| 2007/0146503 A1 | 6/2007 | Shiraki | |
| 2010/0238327 A1 | 9/2010 | Griffith et al. | |
| 2010/0277619 A1 | 11/2010 | Scarff | |
| 2011/0216225 A1 * | 9/2011 | Yoshizumi | ............ H04N 5/228 |
| | | | 348/240.3 |
| 2013/0093842 A1 * | 4/2013 | Yahata | ............... H04N 5/23238 |
| | | | 348/38 |
| 2013/0223759 A1 | 8/2013 | Nishiyama | |
| 2014/0002688 A1 | 1/2014 | Inoue et al. | |
| 2014/0081457 A1 * | 3/2014 | Kobayashi | ............. H01L 21/68 |
| | | | 700/254 |
| 2014/0132735 A1 | 5/2014 | Lee et al. | |
| 2014/0340543 A1 * | 11/2014 | Nakada | ............. H04N 5/23229 |
| | | | 348/239 |
| 2015/0356739 A1 * | 12/2015 | Masuda | ................. G01C 11/06 |
| | | | 348/47 |

FOREIGN PATENT DOCUMENTS

| | | |
|---|---|---|
| EP | 2683154 A2 | 1/2014 |
| EP | 2733921 A1 | 5/2014 |
| JP | 2011055246 A | 3/2011 |
| JP | 2014225843 A | 12/2014 |

OTHER PUBLICATIONS

Office Action issued in Chinese Appln. No. 201610004766.6 dated Oct. 11, 2017. English translation provided.

* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM FOR SYNTHESIZING IMAGES

BACKGROUND OF THE INVENTION

Field of the Invention

The present invention relates to a compound-eye image pickup apparatus including a plurality of arrayed optical systems.

Description of the Related Art

A compound-eye image pickup apparatus achieves a reduction in size of each lens by dividing a single imaging optical system (lenses) included in a typical image pickup apparatus into a plurality of imaging optical systems. However, a conventional compound-eye image pickup apparatus needs a mechanical moving mechanism, and thus an image pickup system increases in size. Accordingly, in the conventional compound-eye image pickup apparatus, it is difficult to add an optical zoom function in which an angle of view for capturing an image can be varied by a method of moving a position of a lens constituting an optical system. Furthermore, previously, a technology of achieving zooming (digital zooming) by image processing by magnifying a desired region in a captured image is known. In this method, a magnification increases with increasing a zoom magnification (zoom power), and a resolution is deteriorated accordingly.

Japanese Patent Laid-open No. 2011-55246 discloses an image pickup apparatus in which a short focus (wide-angle) lens unit and a long focus (telephoto) lens unit which are different in an angle of view are disposed to perform photographing so as to include an identical portion of an object. The image pickup apparatus disclosed in Japanese Patent Laid-open No. 2011-55246 performs electronic zooming by using a camera with a wide angle of view if the zoom magnification is small, and it performs digital zooming by using a camera with a narrow angle of view if the zoom magnification is large. In this case, a zoom-up image obtained by an image pickup element corresponding to the long focus lens is fitted into a part of a wide image obtained by an image pickup element corresponding to the short focus lens, and accordingly the deterioration of the resolution by the digital zooming is reduced.

However, in the image pickup apparatus disclosed in Japanese Patent Laid-open No. 2011-55246, a depth of field varies depending on lens units having different angles of view, and accordingly, a quality of an image generated by synthesizing a plurality of images is deteriorated when a three-dimensional object image is captured.

SUMMARY OF THE INVENTION

The present invention provides an image processing apparatus, an image pickup apparatus, an image processing method, and a non-transitory computer-readable storage medium which are capable of reducing a deterioration of an image quality caused by a difference of a depth of field.

An image processing apparatus as one aspect of the present invention includes an image capturing condition acquirer configured to acquire image capturing condition information of a plurality of images having angles of view different from each other, a distance information acquirer configured to acquire distance information of an object included in the plurality of images, an angle of view information acquirer configured to acquire angle of view information, and an image generator configured to generate an image corresponding to the angle of view information from the plurality of images based on the image capturing condition information, the distance information, and the angle of view information, and the distance information is object distance information at each position in an image.

An image pickup apparatus as another aspect of the present invention includes an image pickup device configured to acquire a plurality of images having angles of view different from each other, an image capturing condition acquirer configured to acquire image capturing condition information of the plurality of images, a distance information acquirer configured to acquire distance information of an object included in the plurality of images, an angle of view information acquirer configured to acquire angle of view information, and an image generator configured to generate an image corresponding to the angle of view information from the plurality of images based on the image capturing condition information, the distance information, and the angle of view information, and the distance information is object distance information at each position in an image.

An image processing method as another aspect of the present invention includes the steps of acquiring image capturing condition information of a plurality of images having angles of view different from each other, acquiring distance information of an object included in the plurality of images, acquiring angle of view information, and generating an image corresponding to the angle of view information from the plurality of images based on the image capturing condition information, the distance information, and the angle of view information, and the distance information is object distance information at each position in an image.

A non-transitory computer-readable storage medium as another aspect of the present invention stores a program which causes a computer to execute a process comprising the steps of acquiring image capturing condition information of a plurality of images having angles of view different from each other, acquiring distance information of an object included in the plurality of images, acquiring angle of view information, and generating an image corresponding to the angle of view information from the plurality of images based on the image capturing condition information, the distance information, and the angle of view information, and the distance information is object distance information at each position in an image.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

First of all, an image processing apparatus in Embodiment 1 will be described. The image processing apparatus of this embodiment generates, based on a plurality of images having angles of view different from each other (i.e., captured image data) and angle of view information specified by a user (i.e., specified angle of view), an image corresponding to the specified angle of view (i.e., angle of view image data). In generating the image, wide-angle of view image data can be obtained by increasing the specified angle of view. On the other hand, telephoto image data can be obtained by decreasing the specified angle of view. In other words, the user can change a zoom magnification of the angle of view image data by changing the specified angle of view. Image processing of this embodiment is usable as processing to generate preview image data for capturing an image or as processing to generate image data having an arbitrary zoom magnification after capturing the image.

Figure 1:
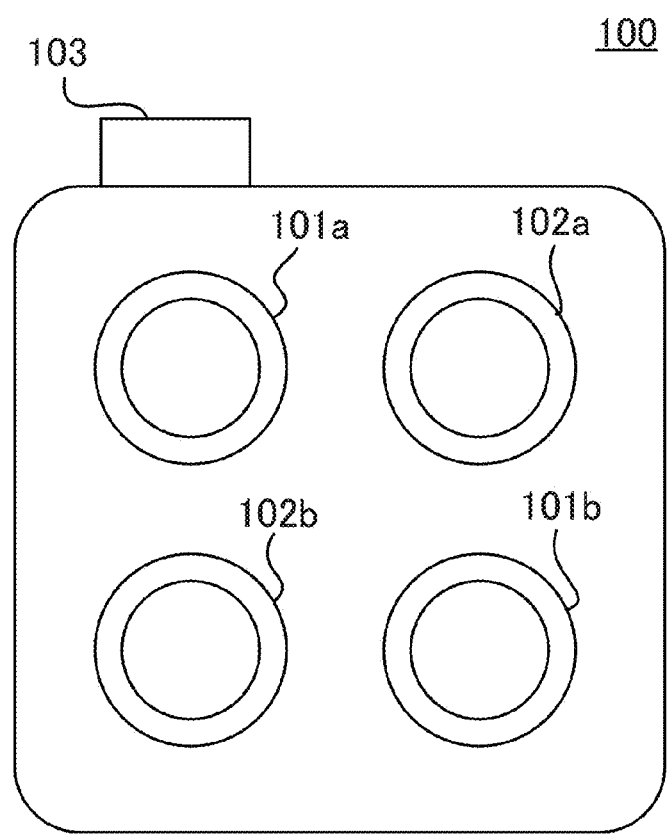
FIG. 1 is a front view of an image pickup apparatus in each of Embodiments 1, 3, and 4.

First, referring to FIG. 1, an external configuration of an image pickup apparatus in this embodiment will be described. FIG. 1 is a front view of an image pickup apparatus 100, and it illustrates an example of a multi-view image pickup apparatus (compound-eye image pickup apparatus) of a compound-eye type including a plurality of image pickup devices. As illustrated in FIG. 1, the image pickup apparatus 100 includes four image pickup devices 101a, 101b, 102a, and 102b (a plurality of image pickup devices) which are capable of acquiring color image data, and an image pickup button 103. The image pickup devices 101a, 101b, 102a, and 102b are disposed so that optical axes of them are parallel to each other.

In this embodiment, an angle of view of each of the image pickup devices 101a and 101b is referred to as $\theta_1$, and an angle of view of each of the image pickup devices 102a and 102b is referred to as $\theta_2$. In other words, the image pickup devices 101a and 101b have the same angle of view, and the image pickup devices 102a and 102b have the same angle of view. In this embodiment, $\theta_1 > \theta_2$ is satisfied and accordingly each of the image pickup devices 101a and 101b has a wider angle of view than that of each of the image pickup devices 102a and 102b. When a user presses the image pickup button 103, the image pickup devices 101a, 101b, 102a, and 102b receive optical information of an object by using respective sensors (image pickup elements). Then, signals received by the sensors are converted from analog signals to digital signals (i.e., A/D conversion is performed on the signals received by the sensors), and thus a plurality of digital data (captured image data) are obtained at the same time. According to the compound-eye type image pickup apparatus, a group of the captured image data in which an identical object is captured from a plurality of viewpoint positions can be obtained. The image pickup apparatus 100 in this embodiment includes the four image pickup devices, but the number of the image pickup devices are not limited thereto if it is two or more.

Figure 2:
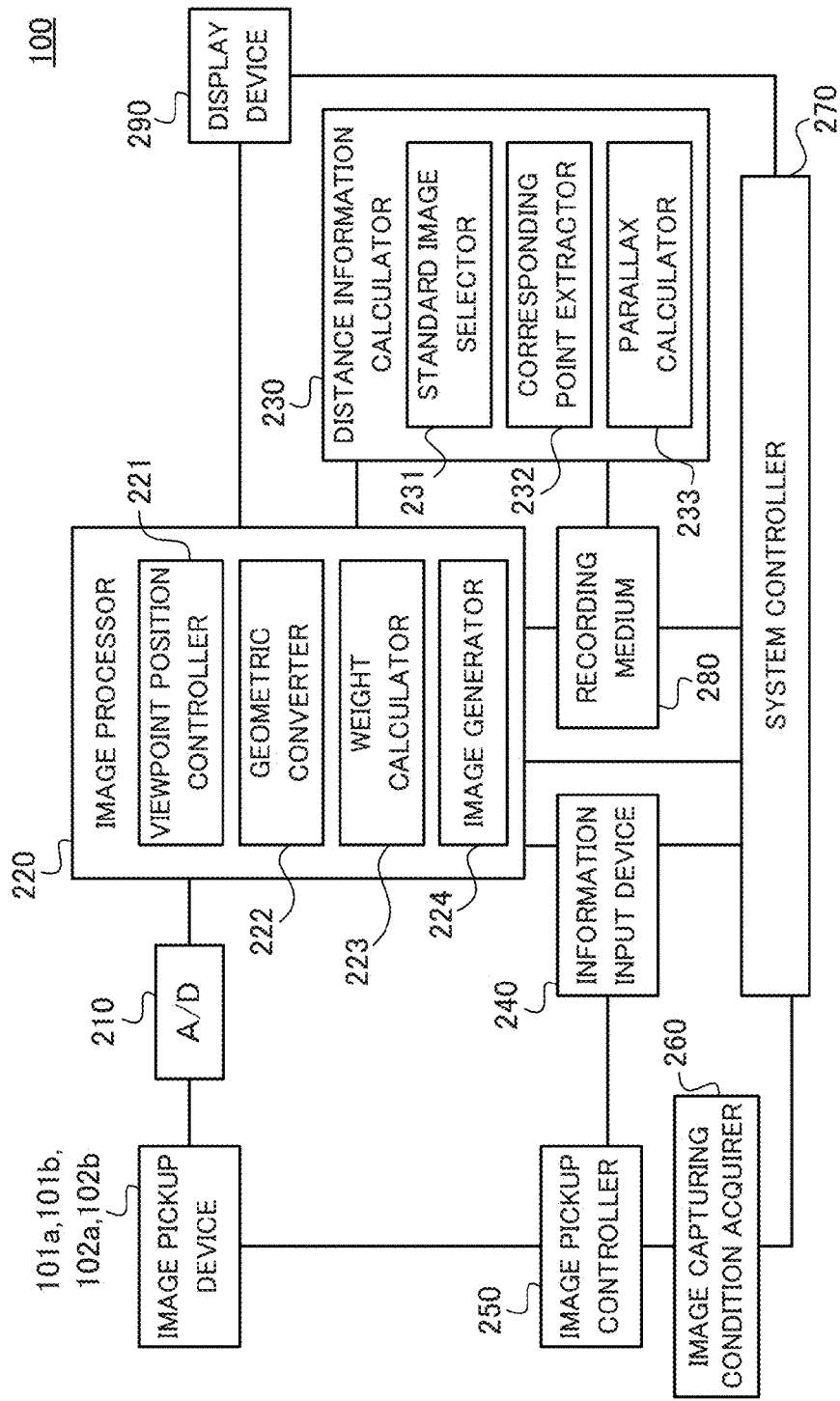
FIG. 2 is a block diagram of the image pickup apparatus in each of Embodiments 1 and 3.

Next, referring to FIG. 2, the configuration of the image pickup apparatus 100 will be described. FIG. 2 is a block diagram of the image pickup apparatus 100. The image pickup apparatus 100 includes the image pickup devices 101a, 101b, 102a, and 102b, and an A/D converter 210. Furthermore, the image pickup apparatus 100 includes an image processor 220, a distance information calculator 230 (distance information acquirer), an information input device 240 (angle of view information acquirer), an image pickup controller 250, and an image capturing condition acquirer 260, and they constitute an image processing apparatus. In addition, the image pickup apparatus 100 includes a system controller 270, a recording medium 280, and a display device 290. The image processor 220 includes a viewpoint position controller 221 (position controller), a geometric converter 222, a weight calculator 223 (weight determiner, or resolution deterioration amount calculator), and an image generator 224. A distance information calculator 230 (distance information acquirer) includes a standard image selector 231, a corresponding point extractor 232, and a parallax calculator 233.

The image pickup apparatus 100 is a lens-integrated image pickup apparatus, but this embodiment is not limited thereto. Alternatively, the image pickup apparatus may include a lens apparatus having an imaging optical system (optical system) and an image pickup apparatus body having an image pickup element to which the lens apparatus is removably attached. In this embodiment, the lens-integrated image pickup apparatus will be described.

Figure 3:
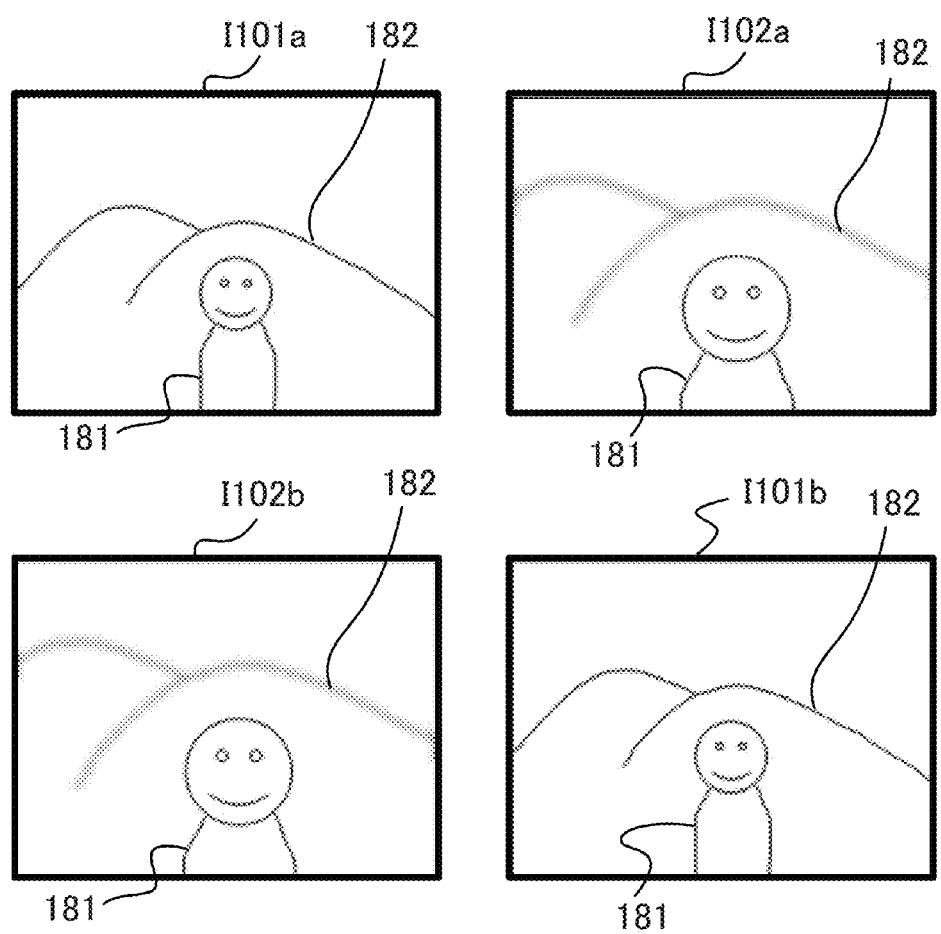
FIG. 3 is an explanatory diagram of captured images in Embodiment 1.

Next, referring to FIG. 3, a captured image in this embodiment will be described. FIG. 3 is an explanatory diagram of captured images. For the purpose of simplifying explanations, FIG. 3 illustrates images captured while focusing on an identical object (person) with the arrangements of the four image pickup devices 101a, 101b, 102a, and 102b of the image pickup apparatus 100 described referring to FIG. 1. The images (captured images) obtained by the image pickup devices 101a, 101b, 102a, and 102b are referred to as I101a, I101b, I102a, and I102b, respectively.

As illustrated in FIG. 3, the images I101a and I101b corresponding to the image pickup devices 101a and 101b are captured images with a wide object space. On the other hand, the images I102a and I102b corresponding to the image pickup devices 102a and 102b are captured image with a narrow object space depending on the angle of view of the image pickup device. In this embodiment, with respect to each of the image pickup devices, each of a size of the image pickup element, a size of a pixel, and an F number of the optical system is set to be the same. On the other hand, focal lengths of the optical systems in the respective image pickup devices are different from each other. In this case, a depth of field of the image pickup device is determined depending on the focal length of the optical system and the F number, and accordingly the depth of field of the image pickup devices 101a and 101b is deep, and the depth of field of the image pickup devices 102a and 102b is shallow. Therefore, with respect to an object (mountain 182) located farther away than a focused object (person 181), a resolution of the mountain 182 in each of the images I102a and I102b is deteriorated compared to a resolution of the mountain 182 in each of the images I101a and I101b.

In FIG. 2, the A/D converter 210 converts an analog signal output from the image pickup element included in each of the image pickup devices to a digital signal, and it supplies the digital signal to the image processor 220. The image processor 220 performs predetermined pixel interpolation processing, color conversion processing, gamma processing, noise reduction processing, and the like on each of image data output from the A/D converter 210, and it performs predetermined calculation processing by using each of the captured image data.

As described below, the viewpoint position controller 221 controls a viewpoint of the image data (captured image data). The geometric converter 222 magnifies or reduces an image based on the angle of view $\theta_1$ of the image pickup devices 101a and 101b, the angle of view $\theta_2$ of the image pickup devices 102a and 102b, and a specified angle of view $\theta'$ that is specified by a user. The weight calculator 223 determines a weight (weight information) which is to be used in synthesizing a plurality of images based on the image capturing condition (image capturing condition information) of the image pickup devices 101a, 101b, 102a, and 102b, the specified angle of view $\theta'$, and object distance information. The image generator 224 multiplies the weight calculated by the weight calculator 223 by the image data converted by the geometric converter 222 to synthesize the plurality of images. As a result, a desired image (image with the specified angle of view) by the user is generated.

The standard image selector 231 selects, from a plurality of parallax images imaged by the respective image pickup devices, a standard image to calculate the object distance information. The corresponding point extractor 232 extracts a corresponding pixel (corresponding point) in each of the parallax images. The parallax calculator 233 calculates each of the parallaxes (parallax amounts) of all the corresponding points extracted by the corresponding point extractor 232. The distance information calculator 230 calculates the object distance information in the image based on the parallax calculated by the parallax calculator 233.

The information input device 240 detects information relating to a desired image capturing condition (such as a specified angle of view $\theta'$, an F number, and an exposure time) selected and input by the user, and it supplies the data (input information) to the system controller 270. Based on the information output from the system controller 270, the image pickup controller 250 moves focus lenses (not illustrated) provided in the respective image pickup devices and controls the image pickup elements corresponding to the respective image pickup devices to acquire a necessary image. The image capturing condition acquirer 260 acquires the image capturing condition (image capturing condition information) containing the focal length, the F number, and an interval distance (base line length) of each image pickup element, and the like.

The recording medium 280 stores a plurality of still images or moving images, and it stores a file header of an image file. Furthermore, the recording medium 280 may temporarily store various pieces of information. The display device 290 displays a preview image in photographing, a captured image, a menu function, a focal length range, a range of an angle of view, and the like, and for example it includes a liquid crystal display element. Furthermore, the display device 290 may have a touch screen function. In this case, an instruction by the user such as an instruction of capturing an image by using the touch screen and an instruction for zooming can be treated as an input of the information input device 240. There are other elements provided in the image pickup apparatus 100, but descriptions thereof are omitted since they are not essences of this embodiment. Hereinafter, it is assumed that the specified angle of view $\theta'$ is within a range of $\theta_2 \leq \theta' \leq \theta_1$.

Figure 4:
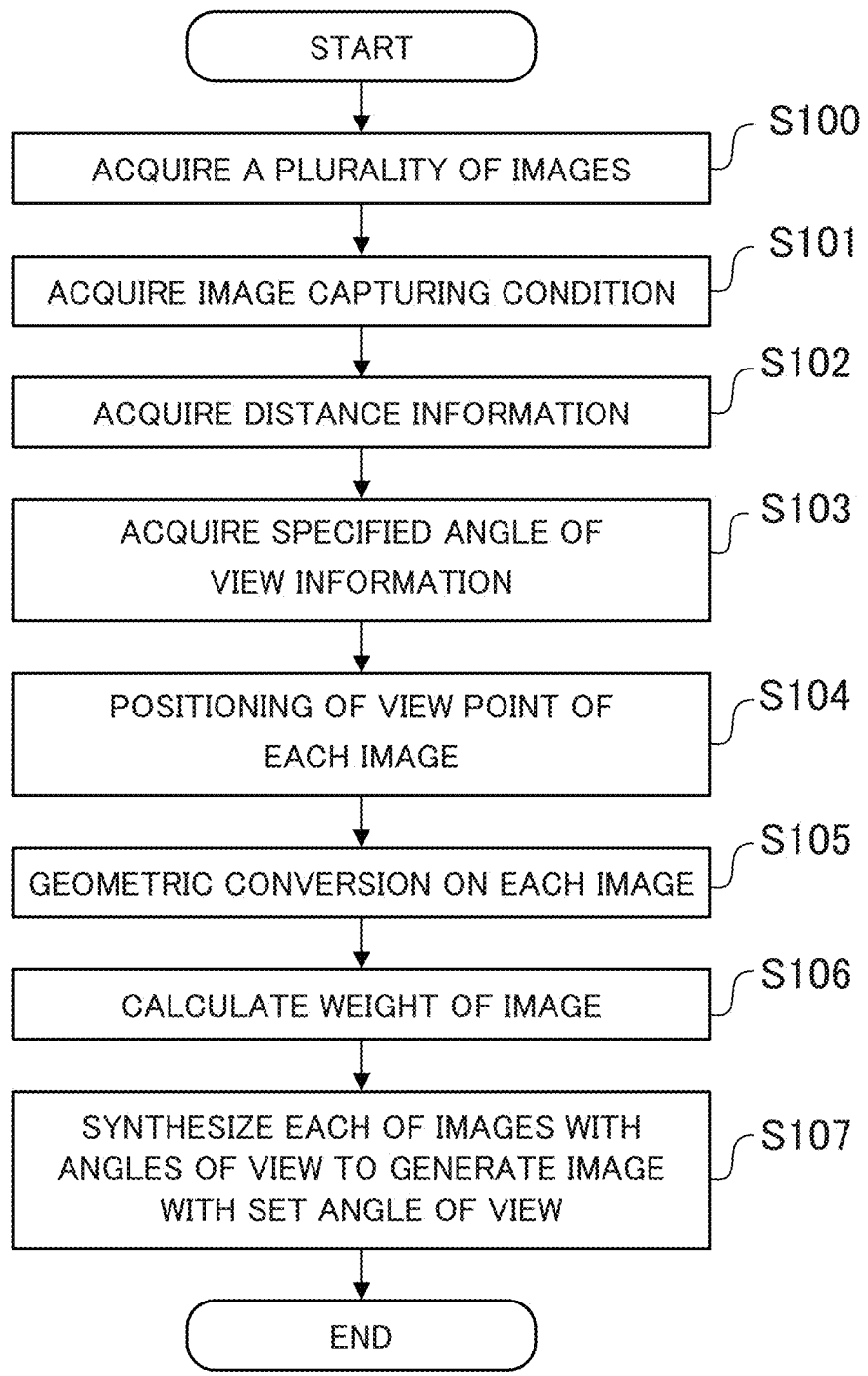
FIG. 4 is a flowchart, of illustrating image processing in each of Embodiments 1 to 3.

Next, referring to FIG. 4, a procedure in a series of processing (image processing) by the image processing apparatus in this embodiment will be described. FIG. 4 is a flowchart of illustrating the image processing in this embodiment. Each step of FIG. 4 is performed by each section of the image pickup apparatus 100 mainly based on an instruction of the system controller 270. In this embodiment, images (captured images) corresponding to image data captured by the image pickup devices 101a, 101b, 102a, and 102b are referred to as $I_{1a}(x,y)$, $I_{1b}(x,y)$, $I_{2a}(x,y)$, and $I_{2b}(x,y)$, respectively.

First, at step S100, the image processor 220 acquires a plurality of images (image signals) via the image pickup device 101a, 101b, 102a, or 102b and the A/D converter 210. The image processor 220 performs predetermined calculation processing on the plurality of acquired image signals to generate a plurality of image data. In this case, it is preferred that the image processor 220 performs correction processing such that luminance levels or white balances of the plurality of images coincide with each other. In this correction processing, a harmful effect such as a luminance unevenness or color unevenness can be reduced during an image synthesis to be performed at the latter stage.

Subsequently, at step S101, the image capturing condition acquirer 260 acquires an image capturing condition (image capturing condition information) containing a focal length of each image pickup device, an F number, an interval distance (base line length) of each image pickup device, and the like. Then, at step S102, the distance information calculator 230 calculates distance information of an object based on a parallax (parallax amount) calculated based on the plurality of images and the focal length of each image pickup device and the data relating to the base line length (i.e., image capturing condition information) as known information. The detail of the distance information calculation processing at step S102 will be described below. Subsequently, at step S103, the information input device 240 acquires a specified angle of view $\theta'$ (specified angle of view information) desired by the user, which is input by the user, from the recording medium 280, the system controller 270, or the like.

Subsequently, at step S104, the viewpoint position controller 221 performs positioning (alignment or adjustment) of the images (viewpoints) by using the plurality of image data, the image capturing condition information, and the specified angle of view information acquired at steps S100, S101, and S103, respectively. The positioned (aligned or adjusted) images are referred to as $J_{1a}(x,y)$, $J_{1b}(x,y)$, $J_{2a}(x,y)$, and $J_{2b}(x,y)$, respectively. The detail of the positioning processing of the viewpoints at step S104 will be described below.

Figure 5:
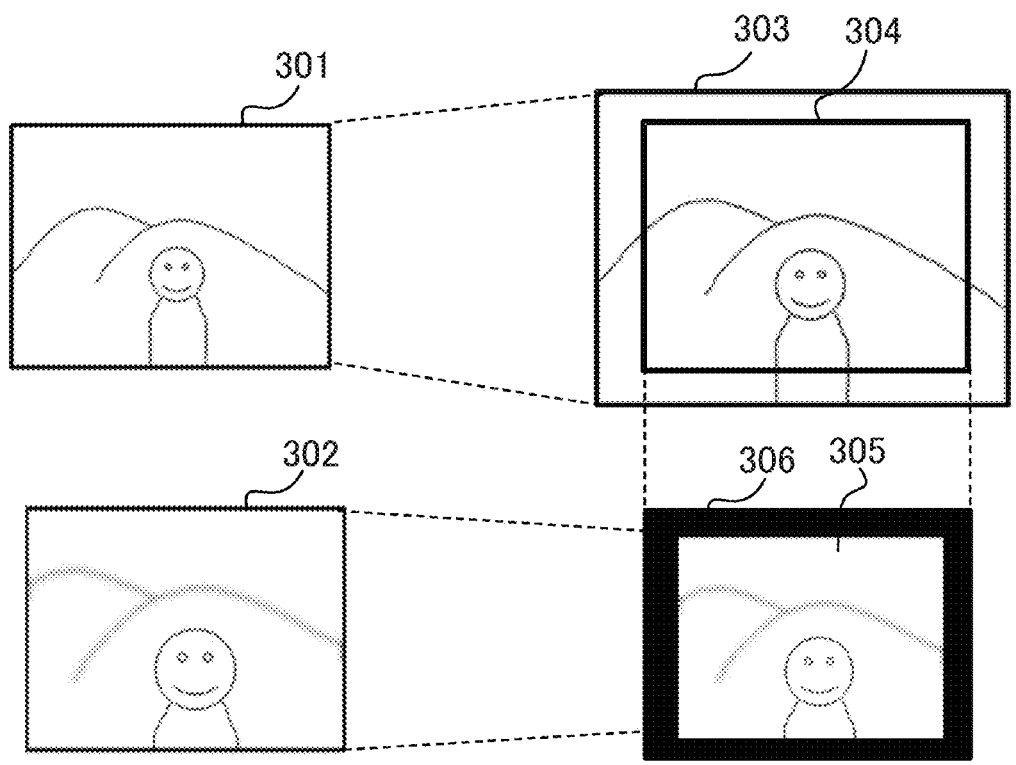
FIG. 5 is an explanatory diagram of geometric conversion processing in each embodiment.

Subsequently, at step S105, the geometric converter 222 performs a geometric conversion of each image, magnification processing or reduction processing of each image. FIG. 5 is an explanatory diagram of the geometric conversion processing performed by the geometric converter 222. In FIG. 5, images 301 and 302 correspond to the positioned image $J_{1a}$ and $J_{2a}$, respectively. As described above, the angle of view $\theta_1$ of the image pickup device 101a is larger than or equal to the specified angle of view θ', and the angle of view $\theta_2$ of the image pickup device 102a is smaller than or equal to the specified angle of view θ'. An image 303 corresponds to an image magnified $\tan \theta_1/\tan \theta'$ times as large as the image 301. An image 304 corresponds to an image obtained by trimming the image 303 to have the angle of view of θ'. An image 305 corresponds to an image reduced $\tan \theta_2/\tan \theta'$ times as small as the image 302. An image 306 corresponds to an image in which peripheral regions are zero (i.e., blacked) to have the angle of view of θ'.

The geometric converter 222 generates the images 304 and 306 based on the images 301 and 302, respectively, corresponding to images in which the viewpoints are positioned by the viewpoint position controller 221. Hereinafter, the images 304 and 306 are represented as geometric conversion images $K_{1a}(x,y)$ and $K_{2a}(x,y)$, respectively. By the same geometric conversion, geometric conversion images $K_{1b}(x,y)$ and $K_{2b}(x,y)$ can be generated based on images $J_{1b}(x,y)$ and $J_{2b}(x,y)$, respectively.

Subsequently, at step S106, the weight calculator 223 calculates a weight (weight coefficients $w_{1a}(x,y)$, $w_{2a}(x,y)$, $w_{1b}(x,y)$, and $w_{2b}(x,y)$) for each of captured image data after the geometric conversion. The weight is determined based on the image capturing condition information, the distance information of the object, and the specified angle of view information acquired at steps. S101, S102, and S103, respectively. The detail of the processing by the weight calculator 223 will be described below.

Finally, at step S107, the image generator 224 multiplies the weight coefficients (x,y) and $w_{2a}(x,y)$ by the geometric conversion images $K_{1a}(x,y)$ and $K_{2a}(x,y)$, respectively, to perform addition and synthesis processing according to the following expression (1).

$$I_{synth}(x,y)=[w_{1a}(x,y)K_{1a}(x,y)+w_{2a}(x,y)K_{2a}(x,y)]/[w_{1a}(x,y)+w_{2a}(x,y)] \quad (1)$$

The generated image data with the specified angle of view θ' are stored in the recording medium 280. Similarly, the image generator 224 can synthesize the geometric conversion images $K_{1b}(x,y)$ and $K_{2b}(x,y)$ to generate the image data with the specified angle of view. Then, the processing of generating the specified angle of view is finished.

Figure 6:
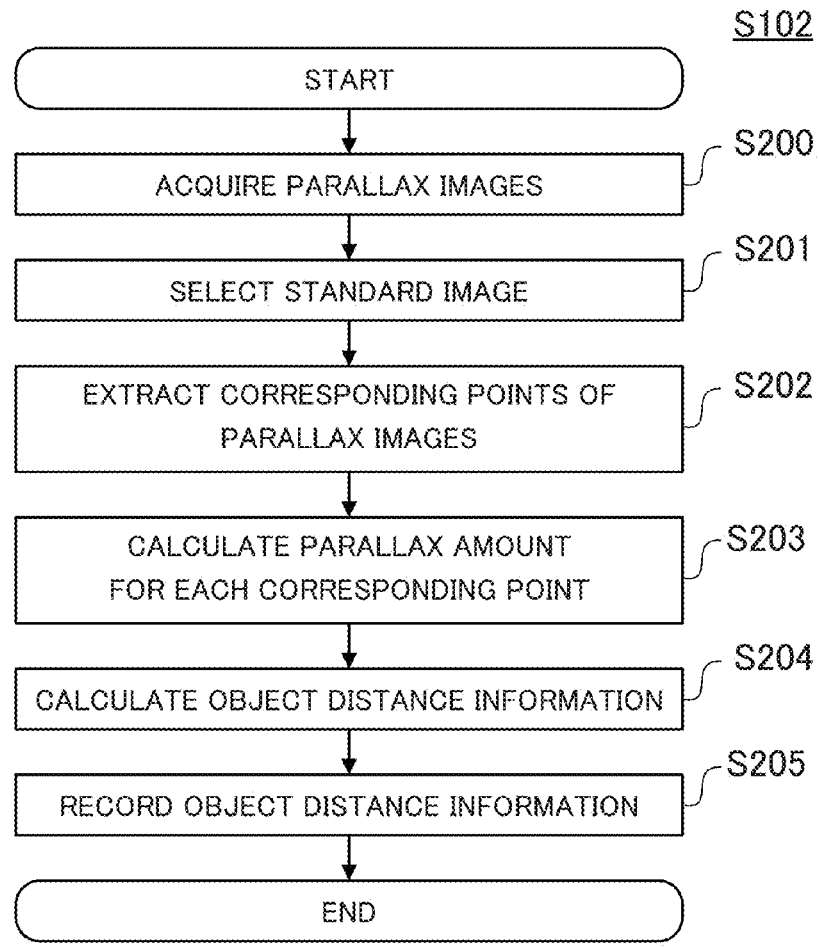
FIG. 6 is a flowchart of illustrating distance information calculation processing in each embodiment.

Next, referring to FIG. 6, the processing of calculating the distance information of the object (step S102 in FIG. 4) will be described. FIG. 6 is a flowchart of illustrating the processing of calculating the distance information. Each step of FIG. 6 is performed mainly by the distance information calculator 230 based on an instruction of the system controller 270. In this embodiment, the processing which is performed when parallax images obtained by the image pickup devices 101a and 101b capturing a widest object space will be described.

First, at step S200, the system controller 270 gives an instruction to form an optical image formed via the optical systems (imaging optical systems) of the image pickup devices 101a and 101b on the image pickup element of the respective image pickup devices when an image capturing instruction signal is input to the information input device 240 in accordance with an operation by a user. Then, the system controller 270 transfers the parallax images to the image processor 220 via the A/D converter 210. The image processor 220 performs predetermined calculation processing on the transferred parallax images to generate image data (parallax image data) corresponding to the respective image pickup devices 101a and 101b.

Subsequently, at step S201, the standard image selector 231 selects one of the parallax image data as a standard image to calculate a parallax (parallax amount). In this embodiment, the image (parallax image data) obtained via the image pickup device 101a is selected as a standard image (standard image data).

Subsequently, at step S202, the corresponding point extractor 232 sets, with respect to the standard image selected by the standard image selector 231, an image obtained via the image pickup device 101b as a reference image (reference image data). Then, the corresponding point extractor 232 detects a pixel (corresponding point) corresponding to the standard image in the reference image. The corresponding pixel (corresponding point) means each pixel corresponding to an identical object for example in parallax image data obtained for the object (person 181) illustrated in FIG. 3.

Figure 7:
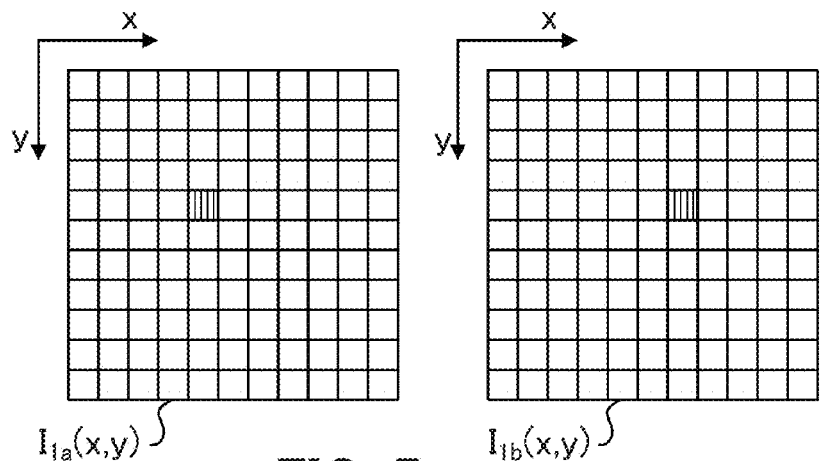
FIG. 7 is an explanatory diagram of a method of extracting a corresponding region in each embodiment.

Referring to FIG. 7, a method of extracting a corresponding object region (pixel), i.e., method of extracting the corresponding region, will be described in detail. FIG. 7 is an explanatory diagram of the method of extracting the corresponding region. As illustrated in FIG. 7, an coordinate in an each image is defined as an origin at the upper left in the image, and horizontal and vertical directions are referred to as an x axis and a y axis, respectively. The brightness of the image coordinate (x,y) of the standard image data $I_{1a}(x,y)$ (corresponding to the image I101a in FIG. 3 of this embodiment) is referred to as F1(x,y), and the brightness of the reference image data $I_{1b}(x,y)$ (corresponding to the image I101b in FIG. 3 of this embodiment) is referred to as F2(x,y).

Hereinafter, searching the pixel (pixel indicated by vertical lines of the reference image data $I_{1b}(x,y)$ in FIG. 7) of the reference image data corresponding to an arbitrary coordinate (x,y) (pixel indicated by vertical lines of the standard image data $I_{1a}(x,y)$ in FIG. 7) in the standard image data will be described. In this case, it can be obtained by searching the brightness of the reference image data which is most similar to the brightness F1(x,y) of the standard image data at the coordinate (x,y). Typically, however, it is difficult to search a pixel which is most similar to an arbitrary pixel. Accordingly, a similar pixel is searched by using a pixel near the image coordinate (x,y) as well, which is a method called a block matching.

For example, block matching processing on conditions that the block size is three will be described. Brightness values of a total of three pixels of a pixel located at the arbitrary coordinate (x,y) in the standard image data and two pixels located at (x−1, y) and (x+1, y) in front of and behind the pixel located at the coordinate (x,y) are referred to as F1(x−y), F1(x−1,y), and F1(x+1 y). On the other hand, brightness values of pixels in the reference image data, shifted by k in an x direction from the coordinate (x,y), are referred to F2(x+k,y), F2(x+k−1,y), and F2(x+k+1,y). In this case, a similarity E of the pixel located at the coordinate (x,y) in the standard image data and the pixel in the reference image data is defined as represented by the following expression (2)

$$E = [F1(x, y) - F2(x+k, y)] + [F1(x-1, y) - F2(x+k-1, y)] + \qquad (2)$$
$$[F1(x+1, y) - F2(x+k+1, y)] =$$
$$\sum_{j=-1}^{1} [F1(x+j, y) - F2(x+k+j, y)]$$

In expression (2), the value of the similarity E is calculated while changing the value of k sequentially, and a coordinate (x+k,y) at which the similarity B is minimized is the corresponding point (corresponding region) in the reference image data with respect to the coordinate (x,y) in the standard image data. For the purpose of simplifying descriptions, the parallax images having a base line in a horizontal direction are described, and in this embodiment the corresponding point (corresponding region) can be detected for a vertical direction or an oblique direction by using the same principle.

Subsequently, at step S203 in FIG. 6, the parallax calculator 233 calculates the parallax of each corresponding point extracted by the corresponding point extractor 232. For example, a difference of pixel positions from each pixel in the reference image data corresponding to each pixel in the standard image data obtained by the block matching method is calculated as a parallax at the corresponding point. Subsequently, at step S204, the distance information calculator 230 calculates the distance information of the object based on the parallax calculated by the parallax calculator 233, the focal length of the imaging optical system as known information, and the base line length data of the image pickup devices.

Figure 8:
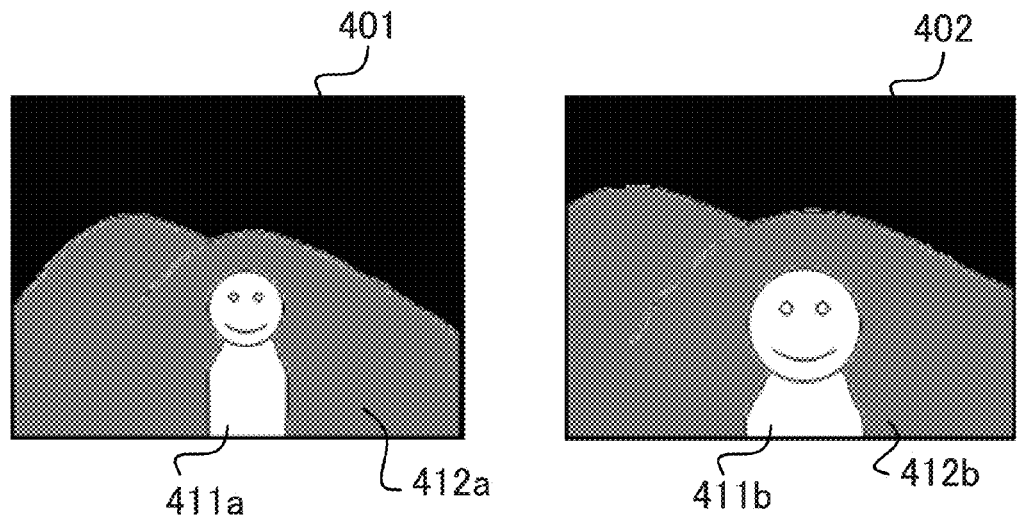
FIG. 8 is an explanatory diagram of a calculation result of distance information in each embodiment.

Referring to FIG. 8, an example of the distance information of the object will be described. FIG. 8 is an explanatory diagram of a result of calculation of the distance information, and it illustrates an example of the distance information of the object. In FIG. 8, distance information 401 corresponds to the image I101a in FIG. 3, and distance information 402 corresponds to the image I102a in FIG. 3. The distance is illustrated according to the gradation from white to black colors. In other words, objects (persons 411a and 411b) located at a short distance are illustrated by white color, and objects (mountains 412a and 412b) located at a long distance are illustrated by a gray color. Since the angle of view of each image pickup device is different but the object distance is the same between the images with different angles of view, the same object region is calculated as the similar distance information.

In this embodiment, the processing of calculating the distance information performed when the image pickup devices 101a and 101b are used is described, and the distance information can be calculated by using other image pickup devices (for example, a pair of the image pickup devices 102a and 102b) in accordance with the same principle. When the corresponding point is to be extracted by using the images with different angles of view, it is preferred that the corresponding point is extracted by cutting out a part corresponding to an image with a narrow angle of view from an image with a wide angle of view.

Finally, at step S205, the system controller 270 records the distance information of the object calculated by the distance information calculator 230 on the recording medium 280, and then the flow is finished.

Next, the viewpoint positioning of each image at step S104 in FIG. 4 will be described in detail. The viewpoint position controller 221 performs positioning (alignment or adjustment of positions) of the images $I_{1a}(x,y)$, $I_{1b})(x,y)$, $I_{2a}(x,y)$, and $I_{2b}(x,y)$ captured by the respective image pickup devices. In this embodiment, a case in which the image $I_{2a}(x,y)$ is to be positioned (aligned) to a viewpoint position of the image $I_{1a}(x,y)$ will be described. The image $I_1$ obtained by the image pickup device 101a is magnified tan $\theta_1$/tan $\theta_2$ times and then it is trimmed, and the magnified and trimmed image is referred to as $I_1'$ similarly to the relationship between the image 301 and the image 303 in FIG. 5.

Subsequently, the parallax in each pixel (region) between the image $I_2(x,y)$ and the image $I_1'(x,y)$ is obtained. The parallax is obtained only for the region of the image 304 in the case of FIG. 5. With respect to the parallax amount, a parallax ($d_x(x,y)$ $d_y(x,y)$) of the image $I_2(x,y)$ viewed from the image (x,y) can be obtained by the block matching performed during the calculation of the distance information. This embodiment is not limited to the block matching, but other methods such as graph cutting may be used if the parallax can be obtained for each pixel (region).

Finally, the image $I_2(x,y)$ is shifted by a parallax (−$d_x$(x, y), −$d_y$(x,y)) to calculate an image $I_2'(x,y)$ as represented by the following expression (3).

$$I'_2(x,y)=I_2(x+d_x'(x,y),y+d_y'(x,y)) \qquad (3)$$

As a result, the image obtained by aligning (positioning) the viewpoint of the image obtained by the image pickup device 102a with the viewpoint of the image obtained by the image pickup device 101a can be obtained.

In this embodiment, the processing of positioning the viewpoint using the images $I_{1a}(x,y)$ and $I_{2a}(x,y)$ is described, and the processing can be performed for a pair of other captured images (for example, a pair of images $I_{1a}(x,y)$ and $I_{1b}$ (x,y)). In this embodiment, the optical axis of each image pickup device is parallel, and the embodiment can be applied also to the configuration in which the optical axes are not parallel to each other. In this case, however, it is necessary to estimate a position or a posture of a camera in advance before capturing an image. As an estimating method, a method of capturing a pattern whose size is known to estimate the position or the posture of the camera based on the corresponding point. Alternatively, a plurality of images with a certain scene may be captured to be associated with a feature point to estimate the position or the posture of the camera. By performing a projection conversion derived from a parameter of the position or the posture of the camera, the image can be converted into an image which is equivalent to an image captured when the optical axes are parallel.

The images in which the viewpoints are positioned (aligned or adjusted) are referred to as $J_{1a}(x,y)$, $J_{1b}(x,y)$, $J_{2a}(x,y)$, and $J_{2b}(x,y)$. The processing of positioning the viewpoints by the viewpoint position controller 221 is as described above.

Figure 9:
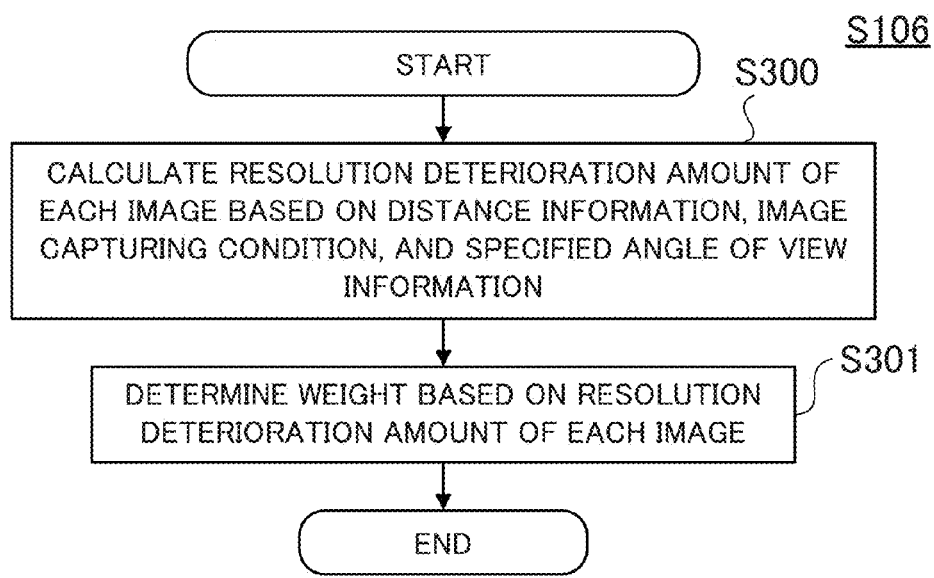
FIG. 9 is a flowchart of illustrating weight calculation processing in Embodiment 1.

Next, referring to FIG. 9, the weight calculation processing of the image (step S106 in FIG. 4) will be described. FIG. 9 is a flowchart of illustrating the weight calculation processing. Each step of FIG. 9 is performed mainly by the weight calculator 223 based on an instruction of the system controller 270.

At step S300, the weight calculator 223 calculates a deterioration amount of a resolution in each image based on the image capturing condition information, the distance information, and the specified angle of view information obtained at steps S101, S102, and S103, respectively. As factors of the deterioration of the resolution in each image, there is blur (blur amount) in a defocus region caused by a depth of field determined depending on the focal length and the F number as image capturing conditions of the image pickup device. A deterioration of an interpolation caused by magnification or reduction processing to the specified angle of view θ' performed by the geometric converter 222 is also one of the factors. The deterioration amounts of the resolution caused by the two factors can be calculated based on the image capturing condition information, the distance information, and the specified angle of view information obtained at the respective previous steps.

Figure 10:
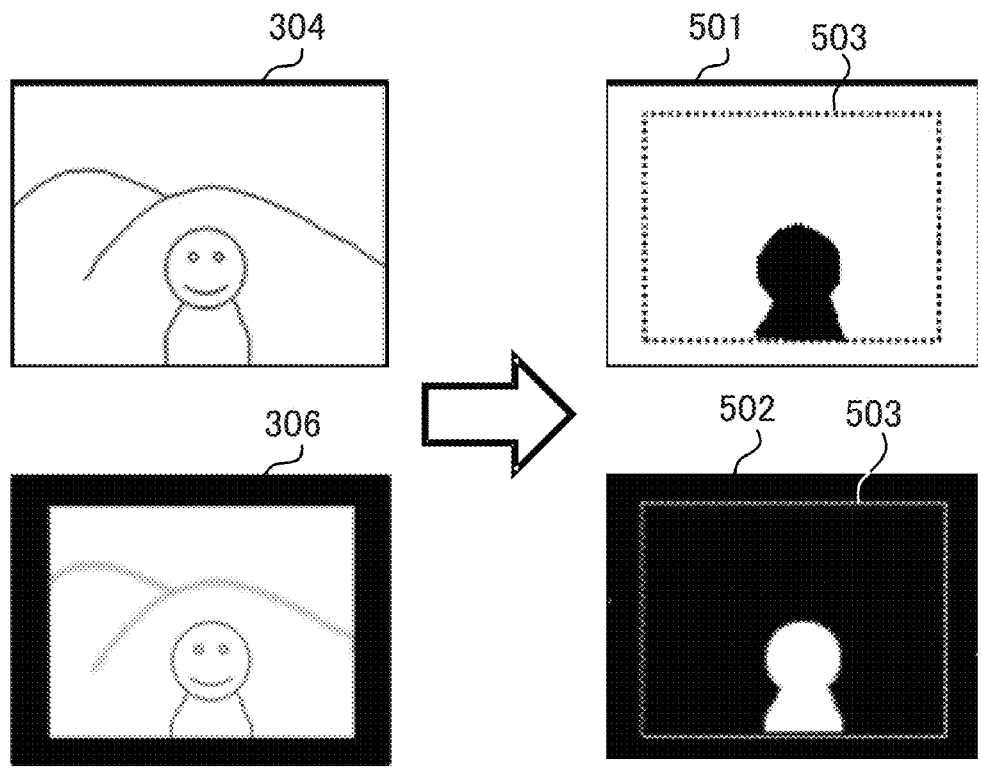
FIG. 10 is an explanatory diagram of the weight calculation processing in Embodiment 1.

Subsequently, at step S301, the weight calculator 223 determines the weight (weight coefficient) which is to be used during the image synthesis based on the deterioration amount of the resolution in each image. Hereinafter, referring to FIG. 10, a method of determining the weight at step S301 will be described. FIG. 10 is an explanatory diagram of the weight calculation processing by the weight calculator 223. In FIG. 10, a dotted line 503 indicates a range of the angle of view $\theta_2$ for the image pickup device 102a. Reference numeral 501 denotes a weight coefficient for the image 304. With respect to the weight coefficient 501, "1" is stored as a weight coefficient outside a range of the angle of view indicated by the dotted line 503, and on the other hand, the weight coefficient is determined based on the deterioration amount of the resolution of the image 304 inside the range of the angle of view indicated by the dotted line 503. With respect to the weight coefficient 501, a white portion indicates that the weight coefficient is 0. Reference numeral 502 denotes a weight coefficient for the image 306. With respect to the weight coefficient 502, a white portion indicates that the weight coefficient is 1 and a black portion indicates that the weight coefficient is 0.

With respect to the object (person) to focus on, there is little difference of the blur amount caused by the depth of field. Accordingly, with respect to the region of the object (person), only the deterioration of magnification or reduction by the geometric conversion occurs. In this case, since the deterioration amount of the resolution caused by the magnification deterioration increases, it is determined that the deterioration of the resolution in the object region of the person inside the dotted line 503 for the weight coefficient 501 is greater than the deterioration for the weight coefficient 502, and accordingly the weight coefficient is set to 0. On the other hand, it is determined that the deterioration of the resolution is small in the object region of the person for the weight coefficient 502, and accordingly the weight coefficient is set to 1.

In this embodiment, each of a size of the image pickup element, a size of the pixel, and the F number of the optical system in each image pickup device is set to be the same. On the other hand, the focal lengths of the optical systems in the respective image pickup devices are different from each other. The depth of field of the image pickup device is determined depending on the focal length and the F number of the optical system, and accordingly in this embodiment the depth of field of the image pickup device 101a is deep and the depth of field of the image pickup device 102a is shallow. Therefore, in the captured image corresponding to the image pickup device 102a, with respect to the object (mountain) located at a distance longer than the focused person, the resolution is greatly deteriorated due to the depth of field. In this embodiment, with respect to the object (mountain) the deterioration of the resolution caused by the depth of field is greater than the deterioration of the magnification by the geometric conversion. Accordingly, with respect to the object portion located at a long distance other than the object portion (person) for the weight coefficient 502, the weight coefficient is set to 0. On the contrary, with respect to the object portion located at a long distance for the weight coefficient 501, it is determined that the deterioration of the resolution is small, and accordingly the weight coefficient is set to 1.

Figure 11:
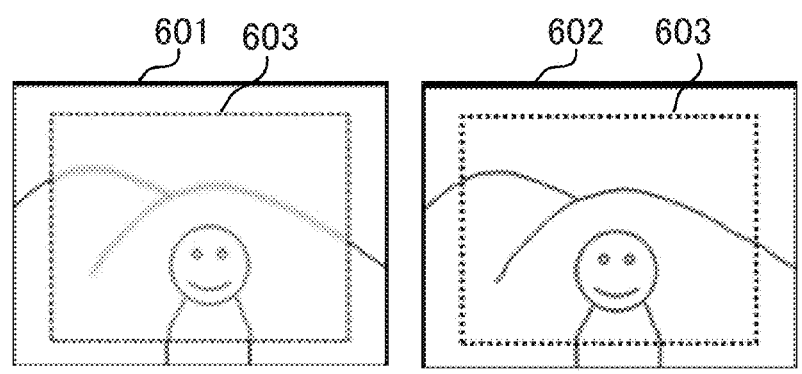
FIG. 11 is an explanatory diagram of an effect of image processing in each of Embodiments 1 to 3.

Next, referring to FIG. 11, an effect of the image processing in this embodiment will be described. FIG. 11 is an explanatory diagram of the effect of the image processing in this embodiment. In FIG. 11, reference numeral 601 denotes an image obtained by simply synthesizing an image which is obtained by magnifying a wide-angle image and is trimmed with an image which is obtained by reducing a telephoto image according to the specified angle of view. Reference numeral 602 denotes an image with the specified angle of view generated by the image processing in this embodiment. Reference numeral 603 denotes an angle of view region at the telephoto side.

As can be seen in FIG. 11, with respect to the image 601, the resolution of the mountain (object) portion in the angle of view region 603 is greatly deteriorated due to the influence of the deterioration of the resolution caused by the depth of field at the telephoto side. In addition, at a boundary of the angle of view region 603, the resolution level difference increases. Also for the person (object), the resolution in the angle of view region 603 is slightly deteriorated due to the influence of the deterioration of the resolution caused by the magnification processing at the wide-angle side. On the other hand, for the image 602, a problem relating to the resolution generated in the image 601 is solved since the weight processing of the image is performed.

As described above, according to this embodiment, image data with a specified angle of view corresponding to an arbitrary specified angle of view can be generated. In other words, in a compound-eye image pickup apparatus including a plurality of optical systems with different discrete angles of view, the deterioration of an image quality of a synthesized image caused by the difference of the depth of field can be reduced. Furthermore, by synthesizing images $K_{1b}(x,y)$ and $K_{2b}(x,y)$, a noise that occurs in an image can be reduced and an S/N ratio of the image can be improved. In addition, by performing blur addition processing on the generated image based on object distance information acquired at a previous stage, an image having an arbitrary depth of field can be generated.

Embodiment 2

Next, an image pickup apparatus in Embodiment 2 of the present invention will be described.

Figure 12:
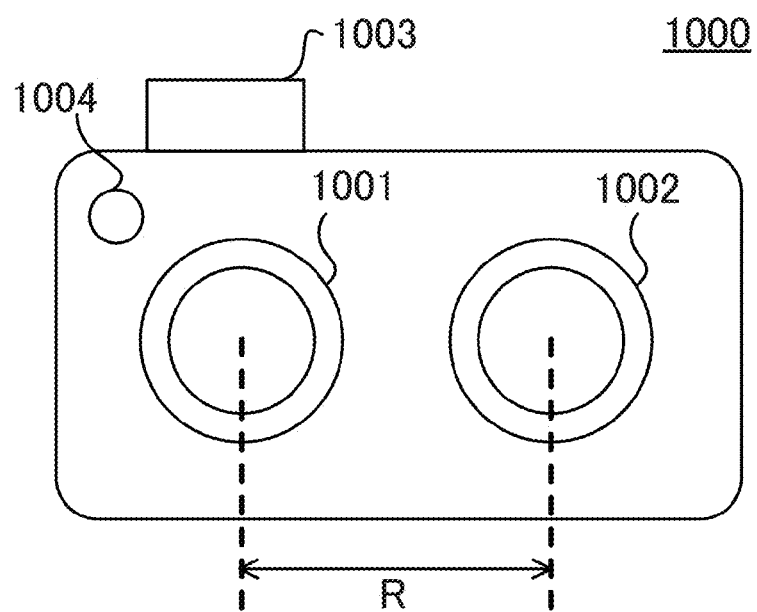
FIG. 12 is a front view of an image pickup apparatus in Embodiment 2.

First, referring to FIG. 12, an external configuration of the image pickup apparatus in this embodiment will be described. FIG. 12 is a front view of an image pickup apparatus 1000, and it illustrates an example of a multi-view image pickup apparatus (compound-eye image pickup apparatus) of a compound-eye type including a plurality of image pickup devices. As illustrated in FIG. 12, the image pickup apparatus 1000 includes two image pickup devices 1001 and 1002 (a plurality of image pickup devices) which are capable of acquiring color image data, and an image pickup button 1003. The image pickup devices 1001 and 1002 are disposed apart from each other by a base line length R so that optical axes of them are parallel to each other.

In this embodiment, an angle of view of the image pickup device 1001 is referred to as $\theta_1$, and an angle of view of the image pickup device 1002 is referred to as $\theta_2$. In this embodiment, $\theta_1 > \theta_2$ is satisfied and accordingly the image pickup device 1001 has a wider angle of view than that of the image pickup device 1002. When a user presses the image pickup button 1003, the image pickup devices 1001 and 1002 receive optical information of an object by using respective sensors (image pickup elements). Then, signals received by the sensors are converted from analog signals to digital signals (i.e., A/D conversion is performed on the signals received by the sensors), and thus a plurality of digital data (captured image data) are obtained at the same time. The image pickup apparatus 1000 includes a distance measurer 1004 that detects a distance of the object by using a light wave range finder such as a laser ranging device. According to the compound-eye type image pickup apparatus, a group of the captured image data in which an identical object is captured from a plurality of viewpoint positions can be obtained.

Figure 13:
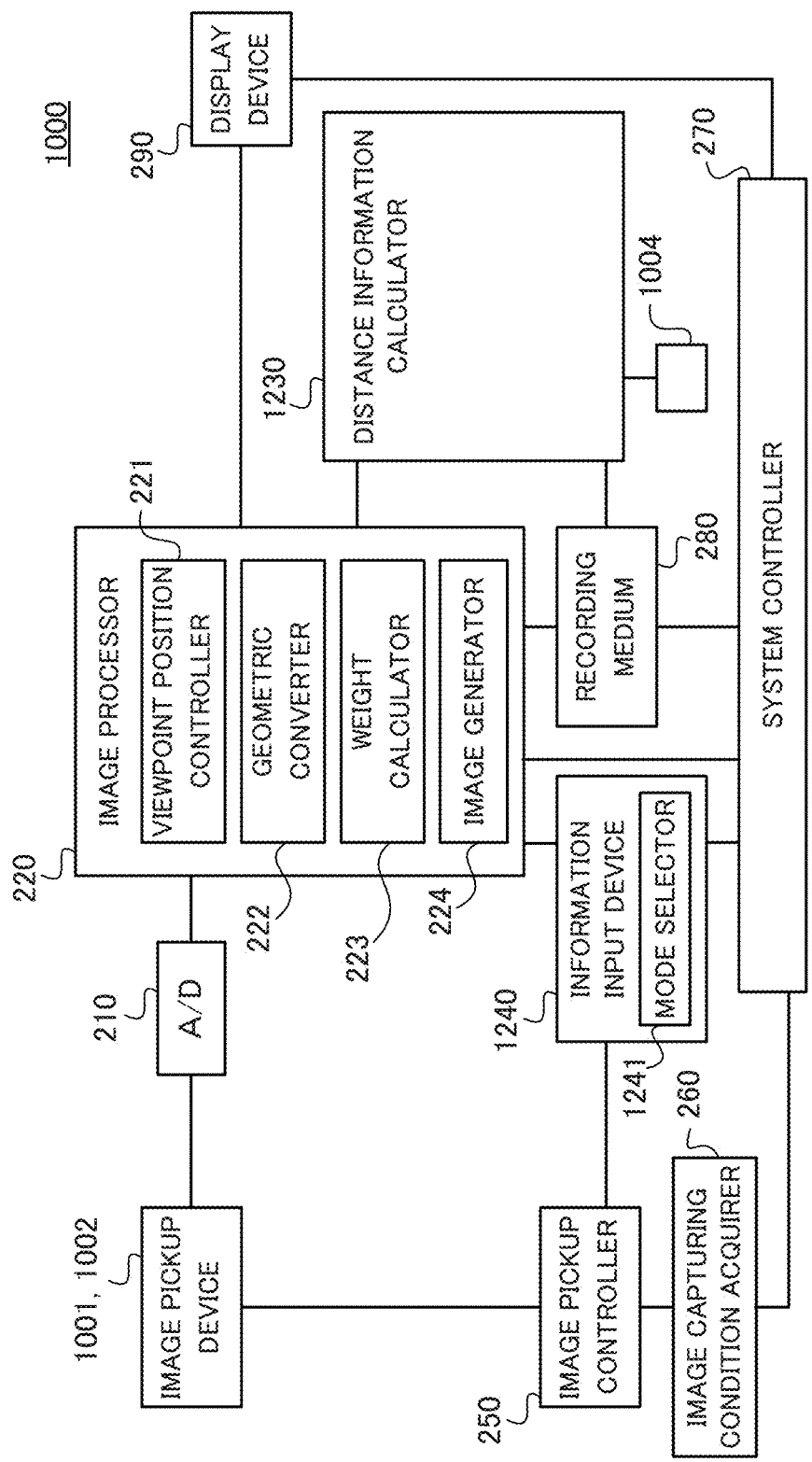
FIG. 13 is a block diagram of the image pickup apparatus in Embodiment 2.

Next, referring to FIG. 13, the configuration of the image pickup apparatus 1000 will be described. FIG. 13 is a block diagram of the image pickup apparatus 1000. The image pickup apparatus 1000 is different from the image pickup apparatus 100 of Embodiment 1 described referring to FIG. 2 in that it includes the image pickup devices 1001 and 1002, the distance measurer 1004, an information input device 1240 including a mode selector 1241, and a distance information calculator 1230. Other configurations of the image pickup apparatus 1000 in this embodiment are the same as those of the image pickup apparatus 100 in Embodiment 1, and accordingly descriptions thereof are omitted. In this embodiment, a captured image through the image pickup device 1001 is similar to the image I101a in FIG. 3, and a captured image through the image pickup device 1002 is similar to the image I102a in FIG. 3.

The distance information calculator 1230 calculates distance information of the object in an image based on information from the distance measurer 1004 including the light wave range finder such as a laser ranging device. The information input device 1240 detects information (data) relating to a desired image capturing condition (such as a specified angle of view θ', an F number, and an exposure time) selected and input by a user, and it supplies the data to the system controller 270. The mode selector 1241 selects an image capturing mode desired by the user. The image pickup apparatus 1000 in this embodiment can select either of a resolution priority mode in which the resolution of the image is prioritized or an S/N priority mode in which a noise level of the image is prioritized, but it is not limited thereto.

A procedure in a series of processing by an image processing apparatus in this embodiment is the same as that illustrated in FIG. 4, and accordingly descriptions thereof are omitted. With respect to distance information calculation processing, unlike that in Embodiment 1, the distance calculation processing described in Embodiment 1 is not necessary since the laser ranging device is used. With respect to viewpoint positioning processing, it is the same as that in Embodiment 1 and accordingly descriptions thereof are omitted.

Figure 14:
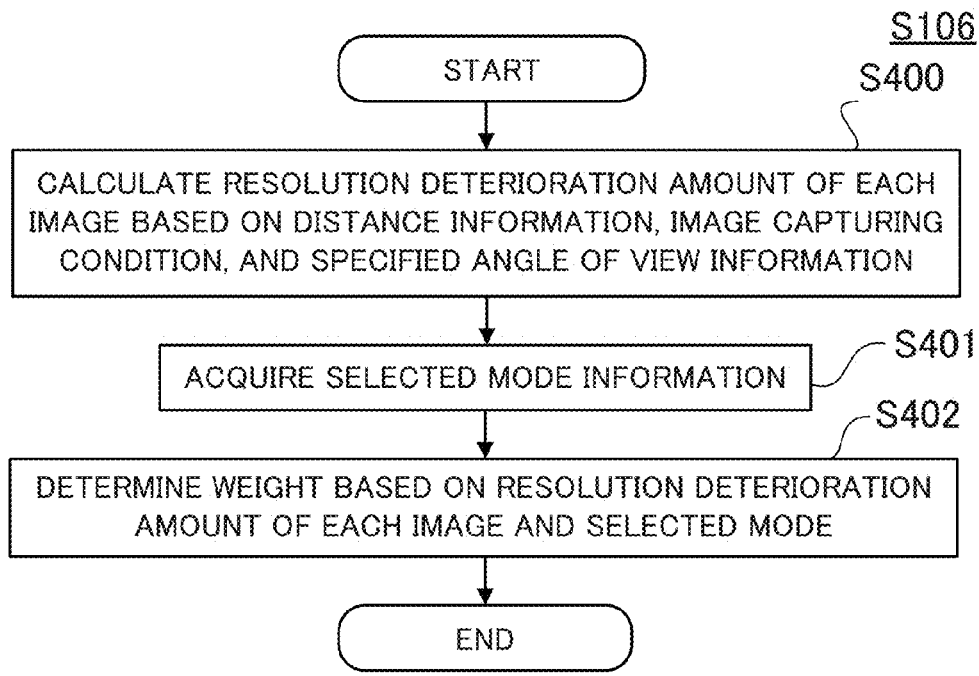
FIG. 14 is a flowchart of illustrating weight calculation processing in Embodiment 2.

Next, referring to FIG. 14, the weight calculation processing (step S106 in FIG. 4) on an image in this embodiment will be described. FIG. 14 is a flowchart of illustrating the weight calculation processing in this embodiment. Each step of FIG. 14 is performed mainly by the weight calculator 223 based on an instruction of the system controller 270.

First, at step S400, the weight calculator 223 calculates a deterioration amount of a resolution in each image based on the image capturing condition information, the distance information, and the specified angle of view information obtained at steps S101, S102, and S103 in FIG. 4, respectively. Subsequently, at step S401, the weight calculator 223 acquires image capturing mode selection information, which is desired by the user, selected via the mode selector 1241. In this embodiment, either of the resolution priority mode in which the resolution of the image is prioritized or the S/N priority mode in which a noise level of the image is prioritized is selected.

Subsequently, at step S402, the weight calculator 223 determines a weight (weight coefficient) which is to be used when performing the image synthesis based on a deterioration amount of the resolution in each image and the image capturing mode selection information. Hereinafter, a method of determining the weight at step S402 will be described. The method of determining the weight in the resolution priority mode is similar to that in Embodiment 1. On the other hand, in the S/N priority mode, instead of simply setting "0" or "1" as a weight depending on the deterioration amount of the resolution, the deterioration of the resolution is permitted to some extent and the weight in each region is set to a value between 0 and 1.

For example, in FIG. 10, with respect to the object portion (person) inside the dotted line 503 for the weight coefficient 501, it is determined that the extent of the deterioration caused by the magnification processing is smaller than that in the object portion (person) for the weight coefficient 502, and accordingly the weight coefficient is set to 0.3. With respect to the object portion located at a long distance other than the object portion (person) for the weight coefficient 502, it is determined that the extent of the deterioration caused by the depth of field is large, and accordingly the weight coefficient is set to 0.2. As described above, by using the image region having a large amount of deterioration of the resolution as a synthesized image depending on the extent of the deterioration of the resolution, the effect of reducing the noise of the synthesized image can be achieved although a slight deterioration of the resolution may occur.

According to this embodiment, an effect similar to that in Embodiment 1 can be achieved in the resolution priority mode, and a noise of the generated image can be reduced in the S/N priority mode if the minimum deterioration of the resolution is permitted.

Embodiment 3

Next, an image pickup apparatus in Embodiment 3 of the present invention will be described. This embodiment relates to weight calculation processing, which is different from the weight calculation processing in Embodiment 1 in that an edge intensity is used as a determination material in addition to the processing in Embodiment 1 described referring to FIG. 9. The configuration of the image pickup apparatus in this embodiment is the same as that of the image pickup apparatus 100 in Embodiment 1, and accordingly descriptions thereof are omitted.

Figure 15:
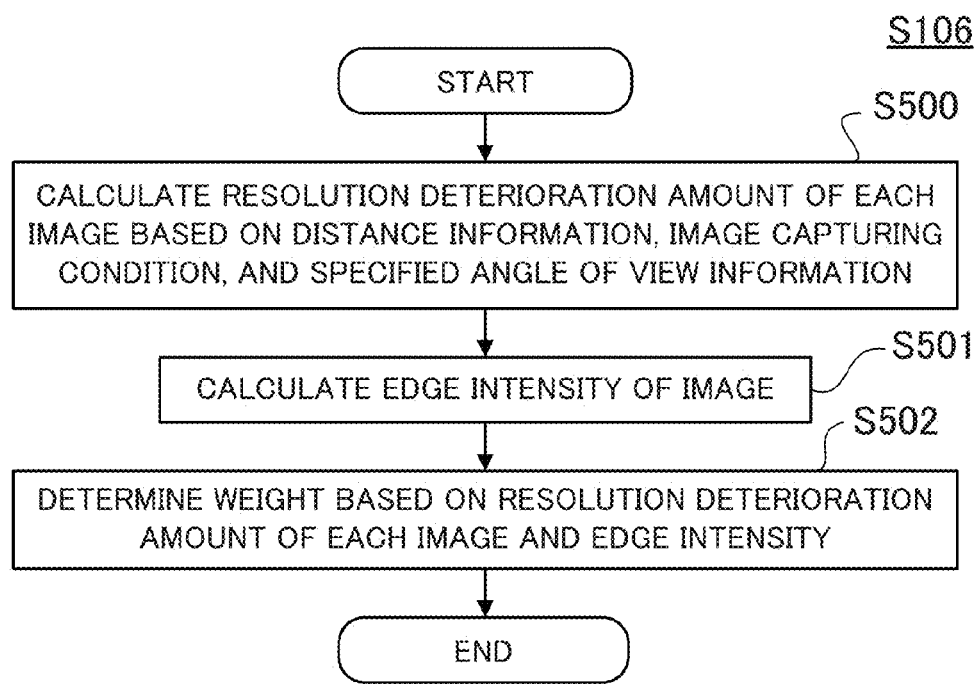
FIG. 15 is a flowchart of illustrating weight calculation processing in Embodiment 3.

Referring to FIG. 15, the weight calculation processing of an image in this embodiment (step S106 in FIG. 4) will be described. FIG. 15 is a flowchart of illustrating the weight calculation processing in this embodiment. Each step in FIG.

15 is performed mainly by the weight calculator 223 based on an instruction of the system controller 270.

First, at step S500, the weight calculator 223 calculates a deterioration amount of the resolution in each image based on the image capturing condition information, the distance information, and the specified angle of view information obtained at steps S101, S102, and S103 FIG. 4, respectively.

Figure 16:
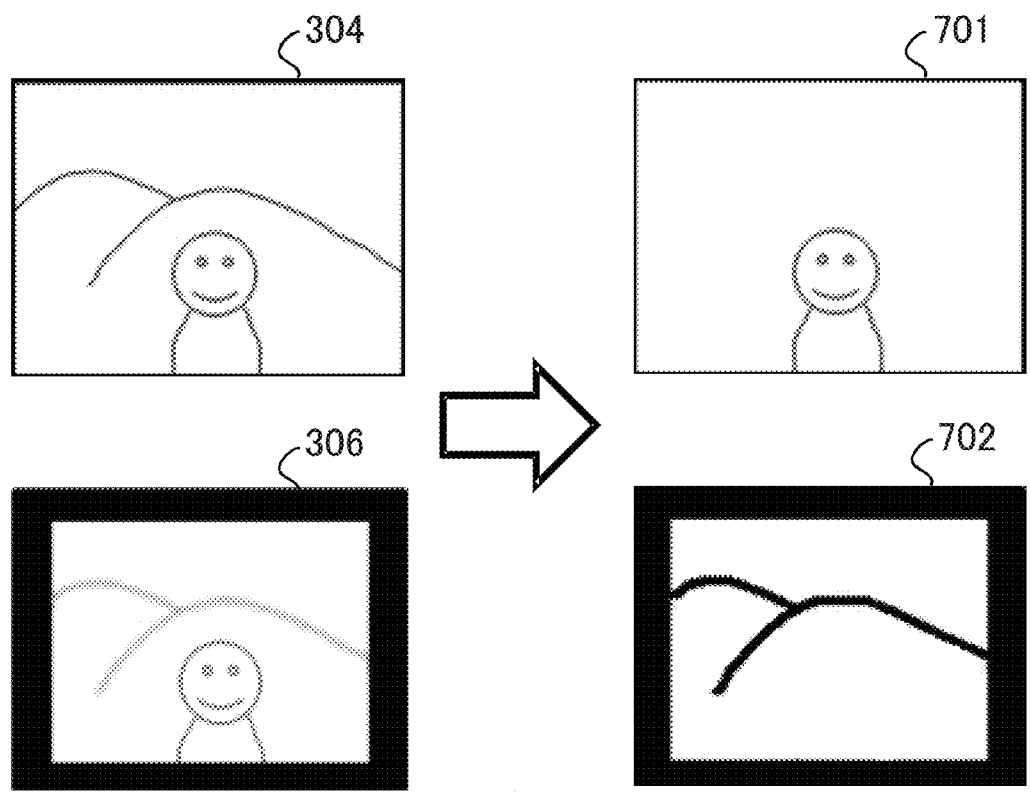
FIG. 16 is an explanatory diagram of the weight calculation processing based on an edge intensity in Embodiment 3.

Subsequently, at step S501, the weight calculator 223 detects an edge (sharp region) in each image and calculates its intensity (edge intensity). Hereinafter, referring to FIG. 16, a method of determining the weight (weight coefficient), i.e., weight calculation processing, based on the edge intensity calculated by the weight calculator 223 will be described. FIG. 16 is an explanatory diagram of the weight calculation processing.

In this embodiment, an edge intensity G(x,y) is calculated according to the following expression (5) by using the Sobel filter represented by the following expression (4).

$$h_h = \begin{pmatrix} 1 & 2 & 1 \\ 0 & 0 & 0 \\ -1 & -2 & -1 \end{pmatrix} h_v = \begin{pmatrix} 1 & 0 & -1 \\ 2 & 0 & -2 \\ 1 & 0 & -1 \end{pmatrix} \quad (4)$$

$$G(x, y) = \sqrt{(h_h * I)^2 + (h_v * I)^2} \quad (5)$$

In expression (5), symbol "*" and "I" denote convolution and an image, respectively. When a value of the edge intensity G (x,y) represented by expression (5) is greater than or equal to a threshold value T, the weight calculator 223 determines the region as an edge (edge region), and determines a weight (weight coefficient) for a block having a size of s×s centered around the pixel of the region.

When a pixel value is [0,255], for example, the threshold value T=20 and the block size s=10 are adopted. As illustrated in FIG. 16, the edge intensity is calculated for each of the image 304 and the image 306, the edge intensities between the two images are compared, and the weight for a portion where the edge intensity is lower is set to 0 (i.e., black portion). For example, for a weight coefficient 701 in FIG. 16, the edge intensity decreases due to the deterioration by the magnification processing for the edge region of a person (object), and accordingly the weight coefficient is 0. On the other hand, for a weight coefficient 702 in FIG. 16, the edge intensity decreases due to the deterioration caused by the depth of field for the edge region of a mountain (object), and accordingly the weight coefficient is 0.

Subsequently, at step S502 in FIG. 15, the weight calculator 223 determines the weight (weight coefficient) which is to be used during the image synthesis based on the deterioration amount of the resolution and the edge intensity in each image. Hereinafter, a method of determining the weight at step S502 will be described. At step S502, the weight calculator 223 adds the weight based on the deterioration amount of the resolution illustrated in FIG. 10 to the weight based on the edge intensity illustrated in FIG. 16 or multiplies the weight based on the deterioration amount of the resolution by the weight based on the edge intensity to determine a synthesized weight (synthesized weight coefficient).

As described above, with respect to the edge region and its peripheral region, the weight for a region having a lower edge intensity is set to 0 and the weight for a region having a higher edge region is set to 1, so that the resolution of the edge region is maintained. On the other hand, with respect to a solid region, the S/N can be improved by using both images for synthesizing the images. When a calculation error of the distance information or the edge intensity occurs, the weight can be determined based on two information and accordingly an error which occurs in determining the weight which is to be used during the image synthesis can be reduced.

According to this embodiment, the edge intensity is used in the weight calculation, and accordingly the resolution of the edge region can be maintained while the S/N can be improved by using both images for synthesizing the images with respect to the solid region. Furthermore, when the calculation error of the distance information or the edge intensity occurs, the weight can be determined based on the two information, and accordingly the error that occurs in determining the weight which is to be used during the image synthesis can be reduced.

Embodiment 41

Next, an image pickup apparatus in Embodiment 4 of the present invention will be described.

Figure 17:
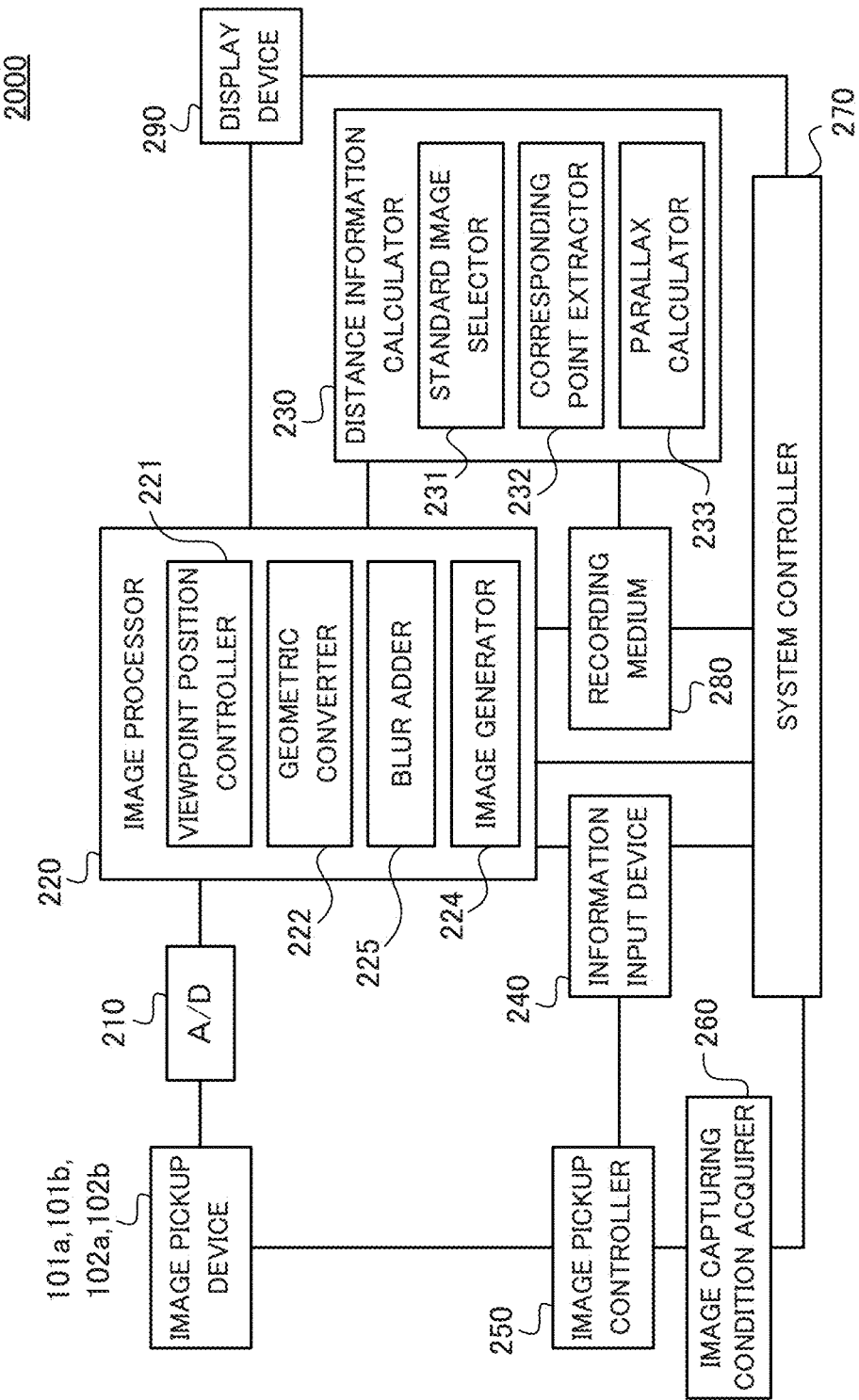
FIG. 17 is a block diagram of an image pickup apparatus in Embodiment 4.

First, referring to FIG. 17, the configuration of the image pickup apparatus in this embodiment will be described. FIG. 17 is a block diagram of an image pickup apparatus 2000. The image pickup apparatus 2000 is different from the image pickup apparatus 100 of Embodiment 1 described referring to FIG. 2 in that a blur adder 225 (resolution deterioration amount calculator), instead of the weight calculator 223, is provided. Other configurations of the image pickup apparatus 2000 in this embodiment are the same as those of the image pickup apparatus 100 in Embodiment 1, and accordingly descriptions thereof are omitted.

The blur adder 225 adds blur so that each image has a similar depth of field during the image synthesis based on the image capturing condition information, the distance information of the object, and the specified angle of view information of the image pickup devices 101a, 101b, 102a, and 102b. The image processor 220 of this embodiment is different from that of Embodiment 1 in that it performs blur addition processing instead of the weight calculation processing during the image synthesis.

Figure 18:
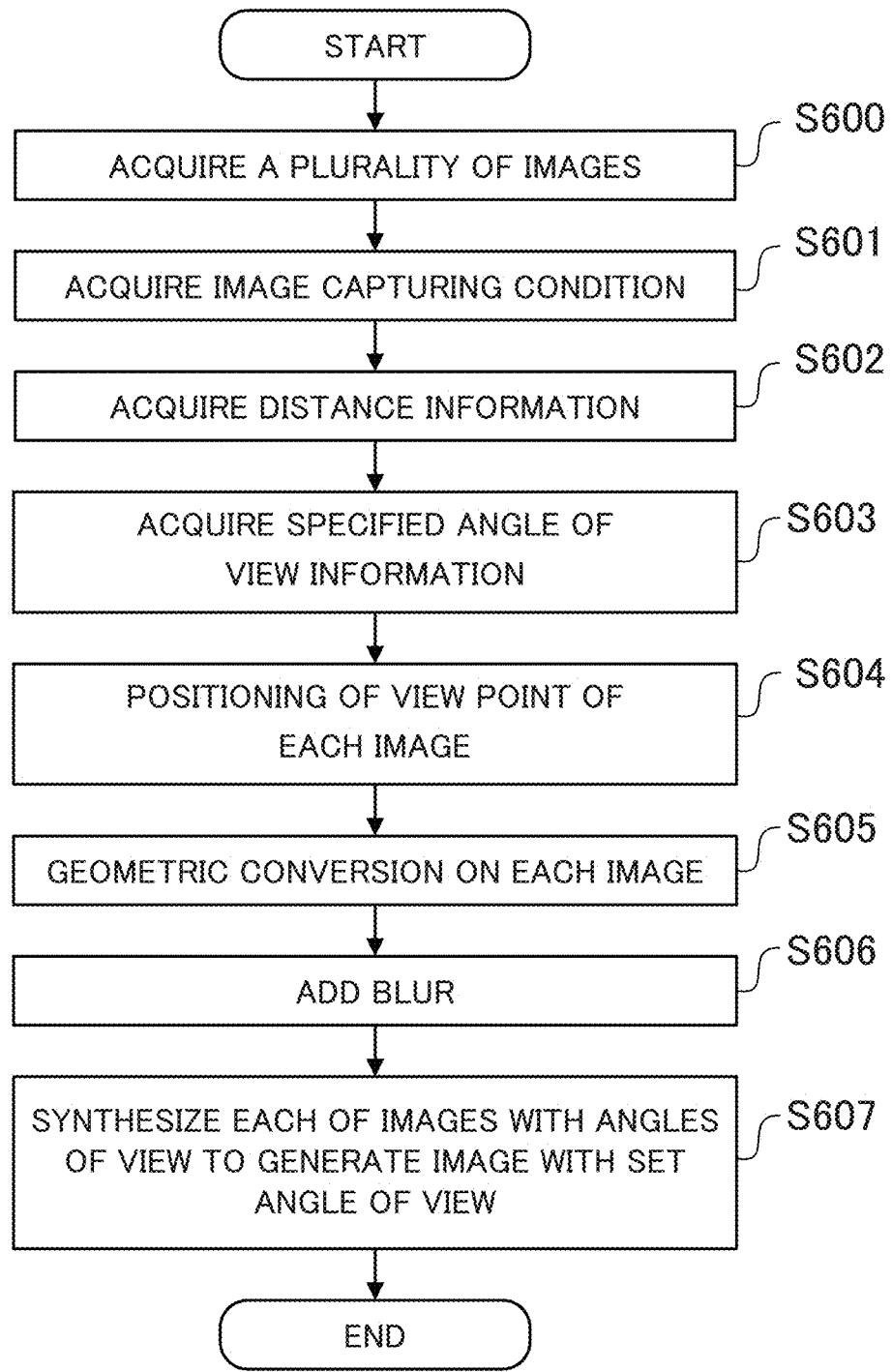
FIG. 18 is a flowchart of illustrating image processing in Embodiment 4.

Next, referring to FIG. 18, a procedure in a series of processing (image processing) by the image processing apparatus in this embodiment will be described. FIG. 18 is a flowchart of illustrating the image processing in this embodiment. Each step of FIG. 18 is performed by each section of the image pickup apparatus 2000 mainly based on an instruction of the system controller 270. Steps S600 to S605 in FIG. 18 are the same as steps S100 to S105 in FIG. 4, respectively.

At step S606, the blur adder 225 adds the blur to each of the captured image data after the geometric conversion based on the image capturing condition information, the distance information of the object, and the specified angle of view information. The detail of the processing by the blur adder 225 will be described below. Finally, at step S607, the image generator 224 synthesizes each of the images to which the blur is added so that the depth of field is similar to each other, and it generates the image data with the specified angle of view. The generated image data with the specified angle of view are stored in the recording medium 280. Then, the flow in FIG. 18 is finished.

Figure 19:
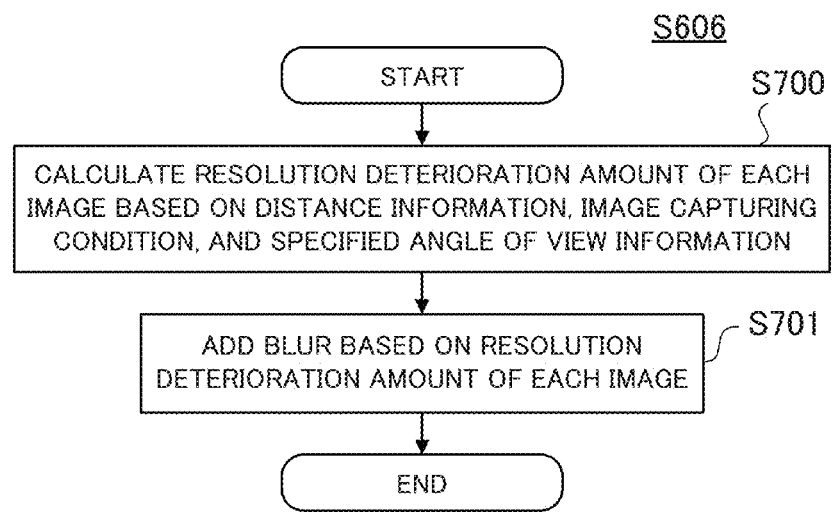
FIG. 19 is a flowchart of illustrating blur addition processing in Embodiment 4.

Next, referring to FIG. 19, the blur addition processing performed by the blur adder 225 will be described in detail. FIG. 19 is a flowchart of illustrating the blur addition processing. Each step of FIG. 19 is mainly performed by the blur adder 225 based on an instruction by the system controller 270.

First, at step S700, the blur adder 225 calculates the deterioration amount of the resolution in each image based on the image capturing condition information, the distance information of the object, and the specified angle of view information obtained at steps S601, S602, and S603, respectively.

Figure 20:
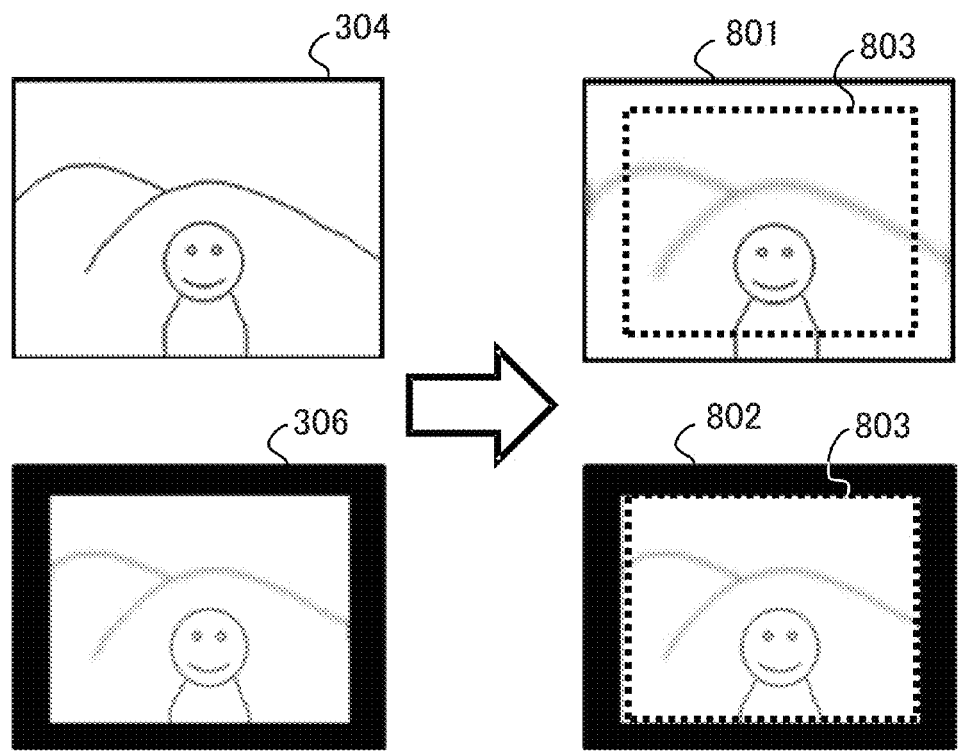
FIG. 20 is an explanatory diagram of the blur addition processing in Embodiment 4.

Subsequently, at step S701, the blur adder 225 adds the blur to each image based on the deterioration amount of the resolution in each image. Hereinafter, referring to FIG. 20, the blur addition processing at step S701 will be described. FIG. 20 is an explanatory diagram of the blur addition processing. In FIG. 20, a dotted line 803 indicates a range of the angle of view $\theta_2$ for the image pickup device 102a. Reference numeral 801 denotes an image obtained by adding the blur to the image 304 based on the distance information of the object so as to have the depth of field similar to that of the image 306.

In this embodiment, each of a size of the image pickup element, a size of the pixel, and the F number of the optical system in each image pickup device is set to be the same. On the other hand, the focal lengths of the optical systems in the respective image pickup devices are different from each other. The depth of field of the image pickup device is determined depending on the focal length and the F number of the optical system, and accordingly in this embodiment the depth of field of the image pickup device 101a is deep and the depth of field of the image pickup device 102a is shallow. Therefore, in the image corresponding to the image pickup device 102a, with respect to the object (mountain) located at a distance longer than the focused person, the resolution is greatly deteriorated due to the depth of field.

In this embodiment, with respect to the object (mountain), the deterioration of the resolution caused by the depth of field is greater than the deterioration of the magnification by the geometric conversion. Accordingly, the blur depending on the distance is added to an object portion located at a long distance other than an object (person) portion in the image 801, so that an image having the depth of field similar to that of the image 802 is obtained. Specifically, filter processing by using a filter which achieves a blurring effect is performed on the image 304. In this embodiment, the Gaussian filter that can adjust a blur amount is used. In this embodiment, a standard deviation of the Gaussian distribution is set as a filter coefficient as a blur amount to be variable based on the distance information of the object.

Figure 21:
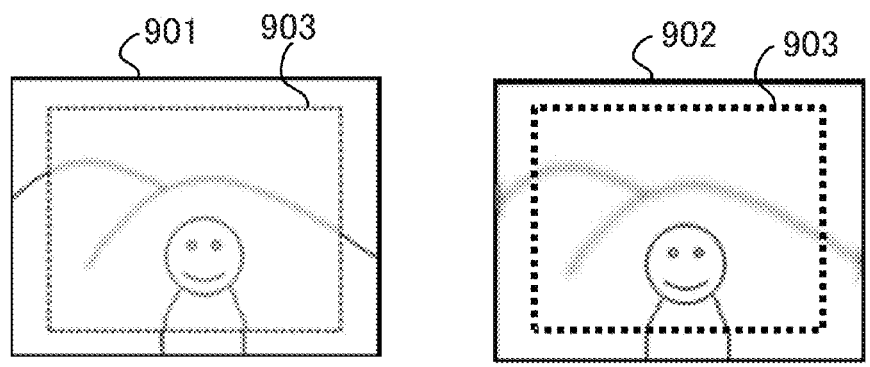
FIG. 21 is an explanatory diagram of an effect of the image processing in Embodiment 4.

Next, referring to FIG. 21, an effect of the image processing in this embodiment will be described. FIG. 21 is an explanatory diagram of the effect of the image processing in this embodiment. Reference numeral 901 denotes an image obtained by simply synthesizing an image which is obtained by magnifying a wide-angle image and is trimmed with an image which is obtained by reducing a telephoto image according to the specified angle of view. Reference numeral 902 denotes an image with the specified angle of view generated by the image processing in this embodiment. Reference numeral 903 denotes an angle of view region at the telephoto side.

As can be seen in FIG. 21, with respect to the image 901, at a boundary of the angle of view region 903, the resolution level difference increases. On the other hand, for the image 902, a problem relating to the resolution generated in the image 901 is solved since each of the images are synthesized after the blur addition processing is performed so that each of the images have the similar depths of field.

As described above, according to this embodiment, image data with a specified angle of view corresponding to an arbitrary specified angle of view can be generated. In other words, in a compound-eye image pickup apparatus including a plurality of optical systems with different discrete angles of view, the deterioration of an image quality of a synthesized image caused by the difference of the depth of field can be reduced. Furthermore, by synthesizing images $K_{1b}(x,y)$ and $K_{2b}(x,y)$, a noise that occurs in an image can be reduced and an S/N ratio of the image can be improved. In addition, by performing blur addition processing on the generated image based on object distance information acquired at a previous stage, an image having an arbitrary depth of field can be generated.

As described above, in each embodiment, an image processing apparatus includes an image capturing condition acquirer 260, a distance information acquirer 230 (1230), an angle of view information acquirer 240 (1240), and an image generator 224. The image capturing condition acquirer is configured to acquire image capturing condition information of a plurality of images having angles of view different from each other. The distance information acquirer is configured to acquire distance information of an object included in the plurality of images. The angle of view information acquirer is configured to acquire angle of view information (specified angle of view information). The image generator is configured to generate an image corresponding to the angle of view information (specified angle of view information) from the plurality of images based on the image capturing condition information, the distance information, and the angle of view information. The distance information is object distance information at each position in an image.

Preferably, the image generator is configured to generate the image corresponding to the angle of view information from the plurality of images based on a deterioration amount of a resolution calculated by using the image capturing condition information, the distance information, and the angle of view information. Preferably, the image processing apparatus includes a position controller (viewpoint position controller 221) configured to control positions of viewpoints for the plurality of images to coincide with each other.

Preferably, the image processing apparatus includes a weight determiner (weight calculator 223) configured to determine a weight based on the image capturing condition information, the distance information, and the angle of view information. The image generator is configured to generate the image corresponding to the angle of view information based on the weight. More preferably, the weight determiner configured to calculate a deterioration amount of a resolution of each of the plurality of images based on the image capturing condition information, the distance information, and the angle of view information, and to determine the weight based on the deterioration amount of the resolution. Preferably, the image processing apparatus includes a mode selector 1241 configured to select an image capturing mode. The image capturing mode includes a resolution priority mode and an S/N priority mode. The weight determiner is configured to determine the weight depending on the image capturing mode selected by the mode selector. Preferably, the weight determiner is configured to determine the weight based on a feature amount of each of the plurality of images. More preferably, the feature amount of each of the plurality of images is an edge intensity of each of the images.

Preferably, the image processing apparatus includes a blur adder 225 configured to add blur to each of the plurality of images based on the image capturing condition information, the distance information, and the angle of view information.

The image generator is configured to generate the image corresponding to the angle of view information from the plurality of images including the blur added by the blur adder. More preferably, the blur adder is configured to calculate a deterioration amount of a resolution of each of the plurality of images based on the image capturing condition information, the distance information, and the angle of view information, and to add the blur based on the deterioration amount of the resolution. More preferably, the blur adder is configured to calculate a deterioration amount of a resolution of each of the plurality of images based on the image capturing condition information, the distance information, and the angle of view information, and to add the blur based on the deterioration amount of the resolution. More preferably, the blur adder is configured to increase the blur with decreasing the deterioration amount of the resolution. Preferably, the blur adder is configured to add the blur so as to reduce a difference of depths of field in the plurality of images. More preferably, the blur adder is configured to add the blur such that the depths of field in the plurality of images coincide with each other.

Preferably, the plurality of images include a plurality of images acquired at an identical angle of view. Preferably, the distance information acquirer is configured to acquire the distance information based on the plurality of images having viewpoints different from each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-002944, filed on Jan. 9, 2015, which is hereby incorporated by reference herein in its entirety.

What is claimed is:

1. An image processing apparatus comprising:
    an image capturing condition acquirer configured to acquire image capturing condition information of a plurality of images having angles of view different from each other;
    a distance information acquirer configured to acquire distance information included in the plurality of images;
    an angle of view information acquirer configured to acquire angle of view information; and
    an image generator configured to generate an image corresponding to the angle of view information from the plurality of images based on a deterioration amount of a resolution calculated by using the image capturing condition information, the distance information, and the angle of view information,
    wherein the distance information is object distance information for at least two objects in an image.

2. The image processing apparatus according to claim 1, further comprising a position controller configured to control positions of viewpoints for the plurality of images to coincide with each other.

3. The image processing apparatus according to claim 1, further comprising a weight determiner configured to determine a weight based on the image capturing condition information, the distance information, and the angle of view information,
    wherein the image generator is configured to generate the image corresponding to the angle of view information based on the weight.

4. The image processing apparatus according to claim 3, wherein the weight determiner is configured to:
    calculate a deterioration amount of a resolution of each of the plurality of images based on the image capturing condition information, the distance information, and the angle of view information, and
    determine the weight based on the deterioration amount of the resolution.

5. The image processing apparatus according to claim 3, further comprising a mode selector configured to select an image capturing mode,
    wherein the image capturing mode includes a resolution priority mode and an S/N priority mode, and
    wherein the weight determiner is configured to determine the weight depending on the image capturing mode selected by the mode selector.

6. The image processing apparatus according to claim 3, wherein the weight determiner is configured to determine the weight based on a feature amount of each of the plurality of images.

7. The image processing apparatus according to claim 6, wherein the feature amount of each of the plurality of images is an edge intensity of each of the images.

8. The image processing apparatus according to claim 1, further comprising a blur adder configured to add blur to each of the plurality of images based on the image capturing condition information, the distance information, and the angle of view information,
    wherein the image generator is configured to generate the image corresponding to the angle of view information from the plurality of images including the blur added by the blur adder.

9. The image processing apparatus according to claim 8, wherein the blur adder is configured to:
    calculate a deterioration amount of a resolution of each of the plurality of images based on the image capturing condition information, the distance information, and the angle of view information, and add the blur based on the deterioration amount of the resolution.

10. The image processing apparatus according to claim 9, wherein the blur adder is configured to increase the blur with decreasing the deterioration amount of the resolution.

11. The image processing apparatus according to claim 8, wherein the blur adder is configured to add the blur so as to reduce a difference of depths of field in the plurality of images.

12. The image processing apparatus according to claim 11, wherein the blur adder is configured to add the blur such that the depths of field in the plurality of images coincide with each other.

13. The image processing apparatus according to claim 1, wherein the plurality of images include a plurality of images acquired at an identical angle of view.

14. The image processing apparatus according to claim 1, wherein the distance information acquirer is configured to acquire the distance information based on the plurality of images having viewpoints different from each other.

15. An image pickup apparatus comprising:
an image pickup device configured to acquire a plurality of images having angles of view different from each other;
an image capturing condition acquirer configured to acquire image capturing condition information of the plurality of images;
a distance information acquirer configured to acquire distance information included in the plurality of images;
an angle of view information acquirer configured to acquire angle of view information; and
an image generator configured to generate an image corresponding to the angle of view information from the plurality of images based on a deterioration amount of a resolution calculated by using the image capturing condition information, the distance information, and the angle of view information,
wherein the distance information is object distance information for at least two objects in an image.

16. An image processing method comprising the steps of:
acquiring image capturing condition information of a plurality of images having angles of view different from each other;
acquiring distance information included in the plurality of images;
acquiring angle of view information; and
generating an image corresponding to the angle of view information from the plurality of images based on a deterioration amount of a resolution calculated by using the image capturing condition information, the distance information, and the angle of view information,
wherein the distance information is object distance information for at least two objects in an image.

17. A non-transitory computer-readable storage medium storing a program which causes a computer to execute a process comprising the steps of:
acquiring image capturing condition information of a plurality of images having angles of view different from each other;
acquiring distance information included in the plurality of images;
acquiring angle of view information; and
generating an image corresponding to the angle of view information from the plurality of images based on a deterioration amount of a resolution calculated by using the image capturing condition information, the distance information, and the angle of view information,
wherein the distance information is object distance information for at least two objects in an image.

* * * * *